(12) United States Patent
Mowry et al.

(10) Patent No.: US 12,119,660 B2
(45) Date of Patent: Oct. 15, 2024

(54) SELF-SYNCHRONIZING DEVICES, SYSTEMS, AND METHODS

(71) Applicant: Renew Power Systems Inc., Minneapolis, MN (US)

(72) Inventors: Gregory S. Mowry, Burnsville, MN (US); Zachary J. Emond, Lakeville, MN (US); Daniel J. O'Connor, Longmont, CO (US); Victoria D. Farias, Fridley, MN (US); Carol D. Mikhael, Lakeville, MN (US)

(73) Assignee: Renew Power Systems Inc., Minneapolis, MN (US)

( * ) Notice: Subject to any disclaimer, the term of this patent is extended or adjusted under 35 U.S.C. 154(b) by 184 days.

(21) Appl. No.: 17/648,089

(22) Filed: Jan. 14, 2022

(65) Prior Publication Data

US 2022/0209541 A1 Jun. 30, 2022

Related U.S. Application Data

(63) Continuation of application No. 17/235,723, filed on Apr. 20, 2021, now Pat. No. 11,228,183.
(Continued)

(51) Int. Cl.
*H02J 3/38* (2006.01)
*H02J 1/12* (2006.01)
*H02J 3/42* (2006.01)

(52) U.S. Cl.
CPC ............... *H02J 3/388* (2020.01); *H02J 1/12* (2013.01); *H02J 3/381* (2013.01); *H02J 3/42* (2013.01)

(58) Field of Classification Search
CPC .... H02J 3/388; H02J 1/12; H02J 3/381; H02J 3/42
See application file for complete search history.

(56) References Cited

U.S. PATENT DOCUMENTS

| 11,228,183 B2 | 1/2022 | Mowry et al. |
| 2005/0242906 A1 | 3/2005 | Gandhi |

(Continued)

OTHER PUBLICATIONS

International Search Report and Written Opinion for international application PCT/US2021/028240 dated Jul. 27, 2021 (13 pages).
(Continued)

*Primary Examiner* — Daniel Cavallari
(74) *Attorney, Agent, or Firm* — Foley & Lardner LLP

(57) ABSTRACT

The present disclosure is directed to self-synchronizing devices that can connect and self-synchronizes voltage, frequency and phase of two or more power sources. The disclosed embodiments enable a modular power system to serve as the primary or secondary source of power for applications requiring loads from a few kilowatts (KW) to the scale of megawatts (MW). The modular system is generalized to use either a single or multiple power generation sources at once, with the ability to connect and self-synchronize voltage, frequency, and phase of a variety of different types of power sources. Power control systems designed to function with self-synchronizing technology enable a modular power system to satisfy a wide variety of needs, simplifying the existing method of achieving synchronization and enabling new features of resiliency and expandability. The self-synchronization can be implemented into a wide variety of electronics including but not limited to inverters and generator controllers.

22 Claims, 22 Drawing Sheets

Related U.S. Application Data

(60) Provisional application No. 63/109,182, filed on Nov. 3, 2020, provisional application No. 63/012,376, filed on Apr. 20, 2020.

(56) References Cited

U.S. PATENT DOCUMENTS

| | | |
|---|---|---|
| 2011/0215652 A1 | 9/2011 | Gengenbach et al. |
| 2012/0126623 A1 | 5/2012 | Koehl |
| 2014/0015326 A1 | 1/2014 | Eberhardt et al. |
| 2014/0226379 A1* | 8/2014 | Harrison ............ H02M 7/5395 363/71 |
| 2014/0292085 A1 | 10/2014 | Yoscovich et al. |
| 2021/0328437 A1 | 10/2021 | Mowry et al. |
| 2022/0209541 A1 | 6/2022 | Mowry et al. |

OTHER PUBLICATIONS

Mcgrath, et al., "Small Signal Dynamic Model and Stability Analysis of a Self-Synchronizing Grid-Tied Current Regulated Inverter", 2019 IEEE Energy Conversion Congress and Exposition (ECCE), 2019, pp. 5561-5568, doi: 10.1109/ECCE.2019.8912196 (Year: 2019).

* cited by examiner

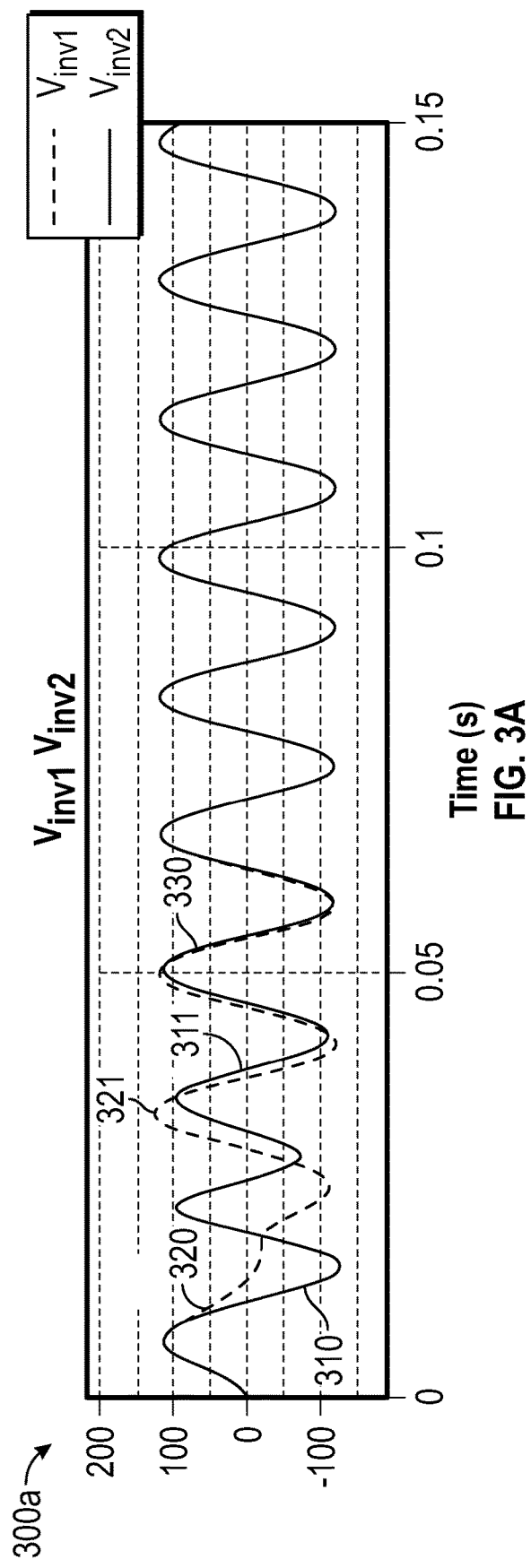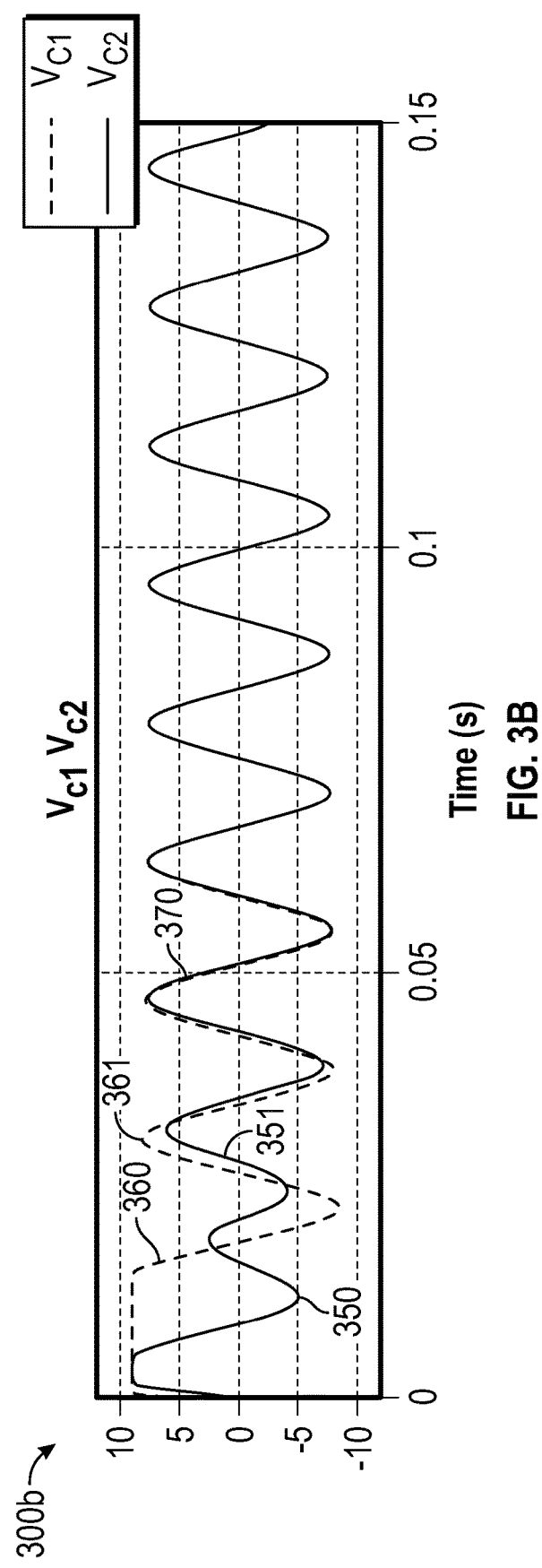

SELF-SYNCHRONIZING DEVICES, SYSTEMS, AND METHODS

RELATED APPLICATIONS

The present application is a continuation of U.S. patent application Ser. No. 17/235,723 entitled SELF-SYNCHRONIZING DEVICES, SYSTEMS, AND METHODS, filed Apr. 20, 2021, which claims the benefit of priority under 35 U.S.C. Section 119(e) of U.S. Provisional Patent Application No. 63/012,376 entitled SELF-SYNCHRONIZING INVERTERS, filed Apr. 20, 2020, and of U.S. Provisional Patent Application No. 63/109,182 entitled SELF-SYNCHRONIZING DRIVERS, filed Nov. 3, 2020, each of which is hereby incorporated herein by reference in its entirety.

TECHNICAL FIELD

The present disclosure relates to self-synchronizing devices generally, and more particularly to self-synchronizing drivers and inverters.

BACKGROUND

Electric machines (and specifically electric generators) dominate the generation landscape in large-scale alternating current (AC) power grids. Large-scale grids typically operate at 60 Hz in the United States of America (U.S.A.). In Europe, and much of the rest of the world, large-scale grids operate at 50 Hz. In AC grids operating with multiple generators, it is necessary for the AC electric machine generators to operate in a synchronous manner. Accordingly, any power generation source should synchronize when connecting to another. Regardless of whether the source is connecting to the grid, another source, or a microgrid including multiple sources, the signals must be synchronized to operate. Further, any electronic device that connects to an AC source should have ability to synchronize with that AC source.

In the U.S.A., essentially all AC generators synchronously operate at 60 Hz. When an additional generator is connected to the existing AC large-scale grid (i.e., when it is brought 'online'), it must first be synchronized through a multistep process before connecting. When other generators are connected to each other, outside of a large-scale grid, the same process must occur between them, and this requirement extends to any number of sources working together on the same connected network.

Automatic synchronization of AC sources, while straightforward, is typically achieved using sensors and relatively costly control systems. Automatic synchronization that is presently available typically involves methods utilizing processers and software to synchronize the signals, and usually involves manual or automatic tuning of the signals independently prior to connecting. Tools such as synchroscopes, sensors, software and controls are typically used. In many cases, master-slave control topologies are used to achieve synchronization. These master-slave control topologies require the designation of a master node to which the slave nodes synchronize. In many cases, master-slave control topologies increases complexity and creates inherent limitations in the expandability and reliability of the system. Often only a limited number of sources using this synchronization method can be combined together without introducing too much complexity and destabilization of the system. Regardless of the methodology used, the process is not amenable to hot-plugging; i.e., one cannot simply connect a generator to an operating grid without first executing the synchronization process.

Currently, these types of automatic synchronization systems are embedded in a variety of control systems, power electronics and inverters, which are typically printed on printed circuit boards (PCBs) or implemented via integrated circuit. The method of synchronizing can vary from application to application, although it is usually achieved through a communication bus or power line.

Traditional grid-level power systems can be quite expensive. The legacy cost-model for such power systems is based on grid-level economics to cover the costs associated with very expensive generation facilities, transmission systems, protection, and distribution systems. More specifically, the economic model for the grid is based on designing assets that will last a long time, sometimes exceeding 50 years, with the costs spread over millions of rate payers. The result of this cost structure leads to relatively low cost to an individual rate-payer given the amortization and rate-payer base. Unfortunately, when this economic model is applied to small-scale power systems, such as microgrids, both conditions (design lifetime and number of rate payers) are much smaller with the result that the economics of the microgrid become expensive, which can be problematic.

SUMMARY

The present disclosure is directed to electrical component design and/or electrical system design that is able to self-synchronize signals autonomously. Power modules, according to some embodiments of the present disclosure, can be modularly added or removed (e.g., hot swapped) without the need to synchronize before connection or shutting the system down while a new power module is added to the overall power system. Self-synchronization and an ability to hot swap power modules opens opportunities to build modular microgrids with a different economic model from the traditional utility grid economic model.

Additional aspects and advantages will be apparent from the following detailed description of embodiments, which proceeds with reference to the accompanying drawings.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIGS. 3A and 3B are graphs illustrating data demonstrating self-synchronization capability within a few cycles when two inverter embodiments according to the present disclosure are hot-plugged together.

DETAILED DESCRIPTION

Figure 1:
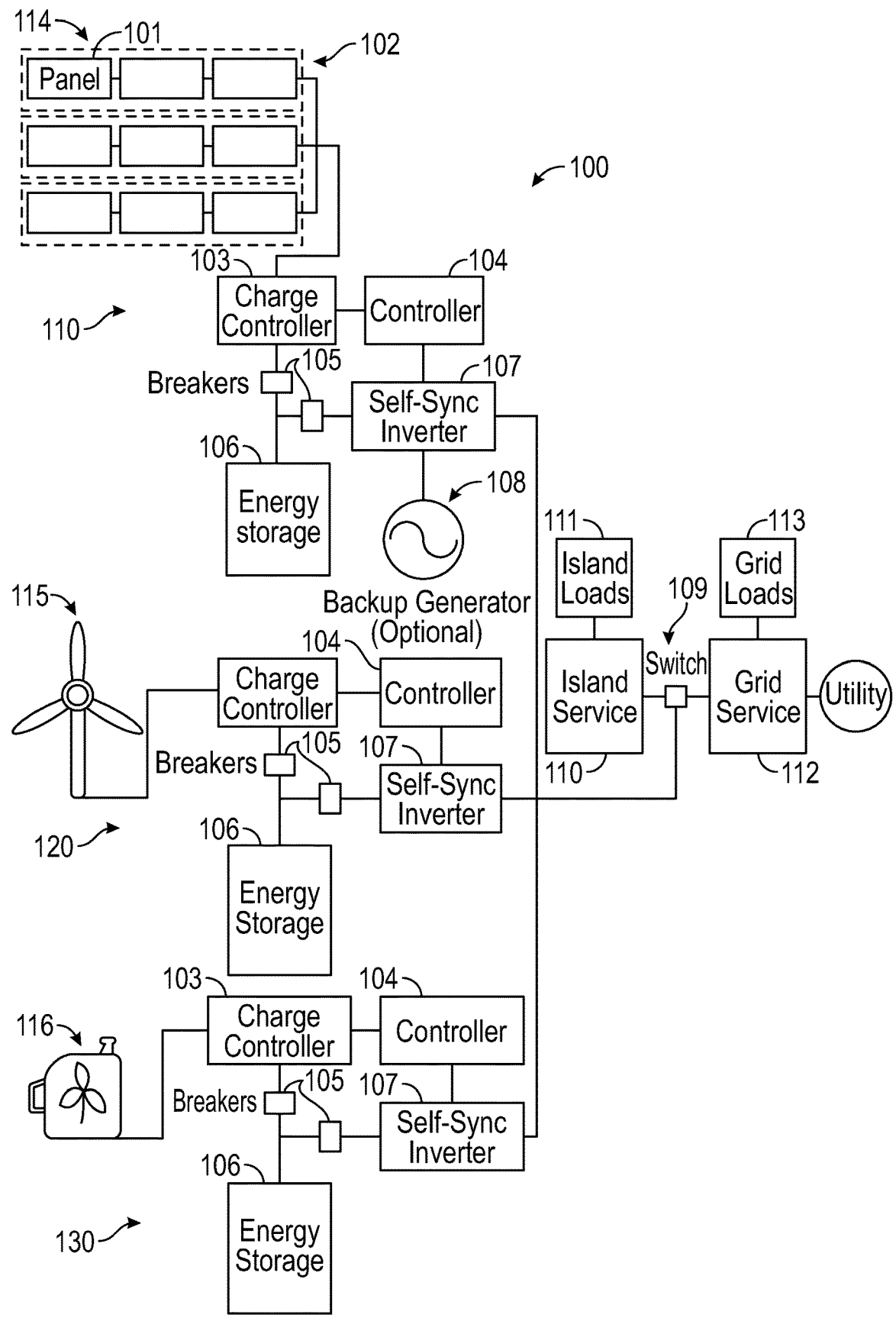
FIG. 1 is a diagram of an embodiment of a modular microgrid system with self-synchronizing inverters, according to one embodiment of the present disclosure.

The present disclosure relates to an electrical component and system design that can self-synchronize signals autonomously. The actual act of synchronization is achieved by the resulting output signal of nonlinear and/or chaotic systems, which are independently capable of such synchronous behavior. Such a system can be arranged in a variety of ways, and the present disclosure is related to the system's capabilities, including the various embodiments of such a system applied to synchronizing AC signals through the use of inverters, converters, control systems or other power electronics utilized to synchronize AC signals.

The embodiments of the present disclosure do not require microprocessors or any programming knowledge, and no frequency-locked loops or phase-locked loops are needed, which are currently industry standards for achieving synchronization. Additionally, the embodiments of the present disclosure use the inherent synchronization feature of the non-linear chaotic circuits, which eliminates the need of tuning filters and loops. This self-synchronizing behavior can be achieved through a variety of arrangements by building a nonlinear circuit that exhibits chaotic behavior. This behavior can also be used to drive the synchronization of AC signals in any variety of control systems.

A self-synchronizing driver, according to embodiments of the present disclosure, enables the ability to modularly add or remove (i.e., hot swap) power modules without the need to synchronize before connection or shutting the system down while a new power module is added to the overall power system. Modular design of the power modules with smart subsystems can enable a hot-swap capability without negatively affecting the overall functionality of the system. The modular design (with self-synchronizing capability) simplifies system design and reduces the need for maintenance and increases system uptime.

The modular design of the power module, according to embodiments of the present disclosure, also enable unlimited stacking of AC signals to interoperate together. Signals can be linearly combined to power a common or shared output. In embodiments of the present disclosure resiliency builds as more signals are synchronized together. The larger a system, the more resistant it becomes to permutations in voltage, or other forms of shocks to the system that may detract from the synchronized signal.

Self-synchronization can significantly reduce costs and complexity in power systems ranging from nano-grid and microgrid to a large-scale grid (e.g., public utility grid) operating with distributed energy resources (DERs) and/or generators.

Furthermore, a modular design enables a volume production of a common and scalable power-block with attendant cost-reductions associated with volume manufacturing. This can result in scalable and economic microgrid implementations. By enabling multiple sources to work together in a seamless fashion, the enabling features of the present disclosure and technology provide a basis for new methods of building and combining power modules.

A driver, according to embodiments of the present disclosure, can be implemented directly into the circuit design of a control system with basic electrical components or through transistors. Actual implementation of a self-sync driver, according to embodiments of the present disclosure, can be done in a variety of ways including but not limited to, fastening of the independent self-syncing component into existing circuitry, PCB integration, transistor integration or other power line communication methods that may be external to the enclosure of the power electronics or control system.

The present disclosure also relates to embodiments of a microgrid system that is designed to economically operate over a range of energy production levels, typically from a few kilowatts (KW) to the megawatts (MW) scale. The microgrid system generates, stores, and deploys energy to the grid or on-site as a primary or secondary source of power.

As a part of a microgrid system, the self-synchronization capability of embodiments of the present disclosure, enables the ability to modularly add or remove (i.e., hot swap) power modules without a need to synchronize before connection or to shut the system down while a new power module is added to the overall power system. Modular design of the power modules with smart subsystems in the module enables the hot-swap capability without negatively affecting the overall functionality of the system, which can simplify system design and reduces the need for maintenance and can increase system uptime.

In one aspect, embodiments of the present disclosure include a self-synchronizing driver that connects and self-synchronizes voltage, frequency, and phase of two or more power sources. The embodiments thus enable a modular power system to serve as the primary or secondary source of power for applications requiring loads from a few kilowatts (KW) to the scale of MW. Such a modular power system can be generalized to use either a single generation source or multiple power generation sources at once, with the ability to connect and self-synchronize voltage, frequency, and phase of a variety of different types of power sources. Power control systems designed to function with self-synchronizing technology, according to embodiments of the present disclosure, enable a modular power system to satisfy a wide variety of needs, simplifying the existing method of achieving synchronization and enabling new features of resiliency and expandability. Further, the embodiments of the present disclosure, including the self-synchronizing driver, can be implemented into a wide variety of electronics including but not limited to inverters and generator controllers.

The embodiments of the present disclosure have been developed in response to the present state of the art and, in particular, in response to the problems and needs in the art that have not yet been fully solved by currently available systems and methods. Features and advantages of different embodiments of the invention will become more fully apparent from the following description and appended claims or may be learned by practice of the embodiments as set forth hereinafter.

Consistent with the foregoing, self-synchronizing devices are disclosed. The self-synchronizing devices, according to the present disclosure, can include a self-synchronizing driver (e.g., a synchronization unit) that enables the self-synchronizing devices to connect and self-synchronize voltage, frequency, and phase of two or more power sources. Self-synchronizing drivers (e.g., synchronization units), according to the present disclosure, thus enable a modular power system to serve as a primary or secondary source of power for applications requiring loads from a few kW to the scale of MW. The modular system is generalized to use either a single or multiple power generation sources at once, with the ability to connect and self-synchronize voltage, frequency, and phase of a variety of different types of power sources. Power control systems designed to function with self-synchronizing technology (e.g., self-synchronizing devices) enable a modular power system to satisfy a wide variety of needs, simplifying the existing method of achieving synchronization and enabling new features of resiliency and expandability. The self-synchronizing driver (e.g., a synchronization unit) is implemented into a wide variety of electronics including but not limited to inverters and generator controllers.

In some embodiments, a self-synchronizing driver (e.g., a synchronization unit) may include a driver output to provide a reference signal for driving a drivable (or controllable) device and a reference input to receive a reference signal from at least one additional self-synchronizing device. The self-synchronizing driver may further include synchronization capability having a non-linear characteristic. The synchronization capability may synchronize the driver with the at least one additional self-synchronizing device, based on the reference signal.

In some embodiments, the self-synchronizing driver (e.g., a synchronization unit) may be implemented in an electrical control system. The electrical control system may include at least one of: an inverter, a synchronizer, a generator control system, and a microgrid control system.

In some embodiments, the self-synchronizing driver (or synchronization unit) may include a non-linear circuit to create the non-linear characteristic. The non-linear circuit may be capable of chaotic behavior. The non-linear circuit may operate in a limit-cycle mode. The synchronization capability may utilize the limit-cycle mode of the non-linear circuit to synchronize the reference signal at the driver output with an additional self-synchronizing device.

In some embodiments, the non-linear circuit of a self-synchronizing driver (or synchronization unit) may include an oscillator. The non-linear circuit may include a Chua circuit. The non-linear circuit may include: one or more non-linear elements; one or more locally active resistors; and three or more energy-storage elements.

In some embodiments, a self-synchronizing device may include a self-synchronizing inverter. The reference signal may be an AC electricity output of the self-synchronizing inverter. In some embodiments, the reference signal may be an AC electricity output of the self-synchronizing inverter connected in parallel to at least one other self-synchronizing device. In some embodiments, the reference signal may be an AC electricity output of the at least one additional self-synchronizing device.

In some embodiments, the reference signal may be a quasiperiodic reference signal or another self-synchronizing driver. The drivable device may include an inverter. In some embodiments, the drivable device may include an electric motor. In some embodiments, the drivable device may be a mechanical device.

In some embodiments, the synchronization capability may include electronic hardware. In some embodiments, the synchronization capability may include one or more software modules executed by one or more processors to simulate an electronic circuit.

Further aspects and embodiments are provided in the description below, the drawings, and the claims.

The following description describes various aspects and embodiments of the inventions disclosed herein. No embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Some terms and phrases that follow have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to" unless expressly specified otherwise and are meant to encompass the items listed thereafter, equivalents thereof, as well as additional items. An enumerated listing of items does not imply that any or all the items are mutually exclusive and/or mutually inclusive, unless expressly specified otherwise.

The terms "a," "an," and "the" also refer to "one or more" unless expressly specified otherwise. In other words, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for description and should not be regarded as limiting.

In the following description of the invention, certain terminology is used for the purpose of reference only and is not intended to be limiting. For example, although the terms first, second, etc. may be used herein to describe various elements, these elements should not be limited by these terms. These terms are only used to distinguish one element from another. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

FIG. 1 is a diagram of an embodiment of a modular microgrid system 100, according to one embodiment of the present disclosure. The modular microgrid system 100 includes three core modules 110, 120, 130 (or power modules) that provide power to the microgrid system 100. Each of the core modules 110, 120, 130 of the microgrid system 100 of FIG. 1 includes a self-synchronizing inverter 107 that can convert DC electricity into AC electricity that is synchronized.

Self-synchronizing systems, such as the modular microgrid system 100, can exhibit several properties and there are various approaches to achieving desired outcomes. Synchronization is needed in any instance where electrical signals must interoperate to share output with one another. The primary uses include but are not limited to stacking of multiple sources to power a common load, stacking of sources to grid-form and power independent loads, and stacking of multiple sources to power both common and independent loads. The disclosed microgrid system 100 of FIG. 1 includes synchronization of the voltage and frequency of self-synchronizing inverters 107.

Each core module 110, 120, 130 includes a charge controller 103, protection 105 (e.g., breakers), an energy storage (ES) device 106, and a self-synchronizing inverter 107. Further, each core module 110, 120, 130 receives DC input from a DER, such as a solar photovoltaic (PV) array 114, a wind turbine 115, and a bio-power source 116.

The charge controller 103 manages a flow of energy, such as for properly controlling the ES device 106 (e.g., a battery charge/discharge process) as well as monitoring general power flow from a DER 114, 115, 116. The charge controller 103 includes an input for receiving electricity from an electrical source such as a DER 114, 115, 116. The charge controller 103 may include an input to receive either AC electricity or DC electricity. The charge controller 103 may include an input for receiving AC electricity and an input for receiving DC electricity. The charge controller 103 regulates the input electricity or otherwise limits the rate at which the DC electricity is added to or drawn from the ES device 106. Stated differently, the charge controller 103 can protect against overcharging or overvoltage, which can reduce the performance or lifespan of the ES device 106 and can pose a safety risk. The charge controller 103 can also protect against deep discharging (or draining) of the ES device 106. The charge controller can also perform controlled discharges, depending on the technology of the ES device 106, to protect the performance and/or lifespan of the ES device 106. The energy storage device 106 serves as a DC link for the system 100. Along with controller 104 this enables the power flow from the DER 114, 115, 116 to be easily managed and monitored.

The protection 105 may be breakers as illustrated in FIG. 1. Low-cost computer-controlled (circuit) breakers 105 may be utilized, which protect subsystems in the event of a fault or abnormal condition. The breakers 105 may be designed to act independently of control in the case of some faults. For example, the breakers 105 may be easily designed to open for abnormal over-current conditions without need of a controller.

The ES device 106 stores energy. While many forms of ES devices are known, a typical and ES technology is battery ES. When battery ES is incorporated into a core module 110, 120, 130, the option of incorporating generalized cell-balancing technology—as applicable—can be used to control charging of individual battery cells for optimal battery storage performance. Generalized cell-balancing technology can also aid in seamlessly being able to add or remove cells without affecting system operation.

The self-synchronizing inverter 107 includes a converter circuit to convert the DC electricity at the DC input to AC electricity at a first AC output, a synchronization unit configured to operate with a non-linear characteristic, and an AC output. In FIG. 1, each core module (and thereby the AC output of each self-synchronizing inverter 107) is connected in parallel to a load of the microgrid system 100. In one embodiment, the synchronization unit of each self-synchronizing inverter 107 receives a reference signal and synchronizes its AC output with the AC output of the other self-synchronizing inverter 107 based on the reference AC signal to produce a combined synchronized AC power output.

A core module 110, 120, 130 can also include an optional power module controller 104. The power module controller 4 provides logging and monitoring of the components of the core module 110, 120, 130. The power module controller 104 may also receive communication, such as from another power module controller 104, an external entity, or some other communication source. The power module controller 4 may direct operation of the charge controller 103, the DER 114, 115, 116, the ES device 106, and/or the self-synchronizing inverter 107 based on a received communication. The power module controller 104 may also transmit or otherwise provide communication to other entities.

A core module 110, 120, 130 can also include an optional backup generator 108. While the generator connection 108 is available in all modules, a single microgrid generator often suffices, as illustrated in the top module 110, and consequently is not replicated in the middle module 120 or bottom module 130.

In FIG. 1, the first or top-most module 110 includes a DER that is a solar PV array 114 with a plurality of PV panels 101 and either fixed mounting, solar tracking or solar pointer technology 102.

The second or middle module 120 is essentially identical to the top module 110 with a wind turbine 115 as a DER instead of the solar PV array 114 and solar pointer DER of the top module 110. Self-synchronization is enacted between the core modules 110, 120, 130 and to the grid 112.

The third or bottom module 130 is essentially identical to the top module 110 and middle module 120 with a bio-power source 116 as a DER instead of the solar PV array 114 or wind turbine 115. As illustrated, the core modules 110, 120, 130 are self-synchronizing and modular to accept a variety of power sources, such that a microgrid can be operated on any combination of a single DER, or multiple DERs.

The self-synchronizing inverter 107 allows the modules to be stacked and replicated independent of the type of DER that exists in the microgrid. The example shown in FIG. 1 is just one potential layout of DERs working together in a system. The self-synchronizing technology is not limited to just three sources working together; it enables an arbitrary number of sources to synchronize, lifting significant limitations of traditional methods of synchronization.

As can be appreciated, the DER coupled to a core module could be any energy resource such as solar PV, fuel cells, generators, additional storage (e.g., battery or flywheel), hydroelectric power, and so forth. The core module 110 (or power module) is designed so that any of these DERs can be substituted for the solar PV DER 114 without affecting the performance of the module 110. The other core module 120, 130 demonstrate this similar design and substitution of a different DER 115, 116 in place of the solar PV DER 114.

A core module 110, 120, 130, and more specifically a device such as the self-synchronizing inverter 107, incorporates self-synchronizing technology that enables multiple core modules (and therefore multiple electricity sources) to self-synchronize their respective AC output without a controller. This capability enables hot-swapping core modules 110, 120, 130 without forcing the microgrid system 100 to shut down when a core module 110, 120, 130 is added to or removed from the overall microgrid system 100. Further, the capability enables hot-swapping core modules without forcing the AC power system 100 to shut down when a core module is added to or removed from the overall power system. Accordingly the expansion of DERs in the microgrid system 100 (or any AC power system) can be accomplished in a seamless and dynamic manner.

As can be appreciated, FIG. 1 illustrates one possible arrangement and use of the disclosed embodiments within a multi-source microgrid system 100 powering a single load. The same multi-source microgrid system 100 could also be used to power multiple loads. Additionally, the other electronic components and energy storage could be arranged in any variety of ways that are commonly accepted in the renewable and microgrid development industries.

Figure 2:
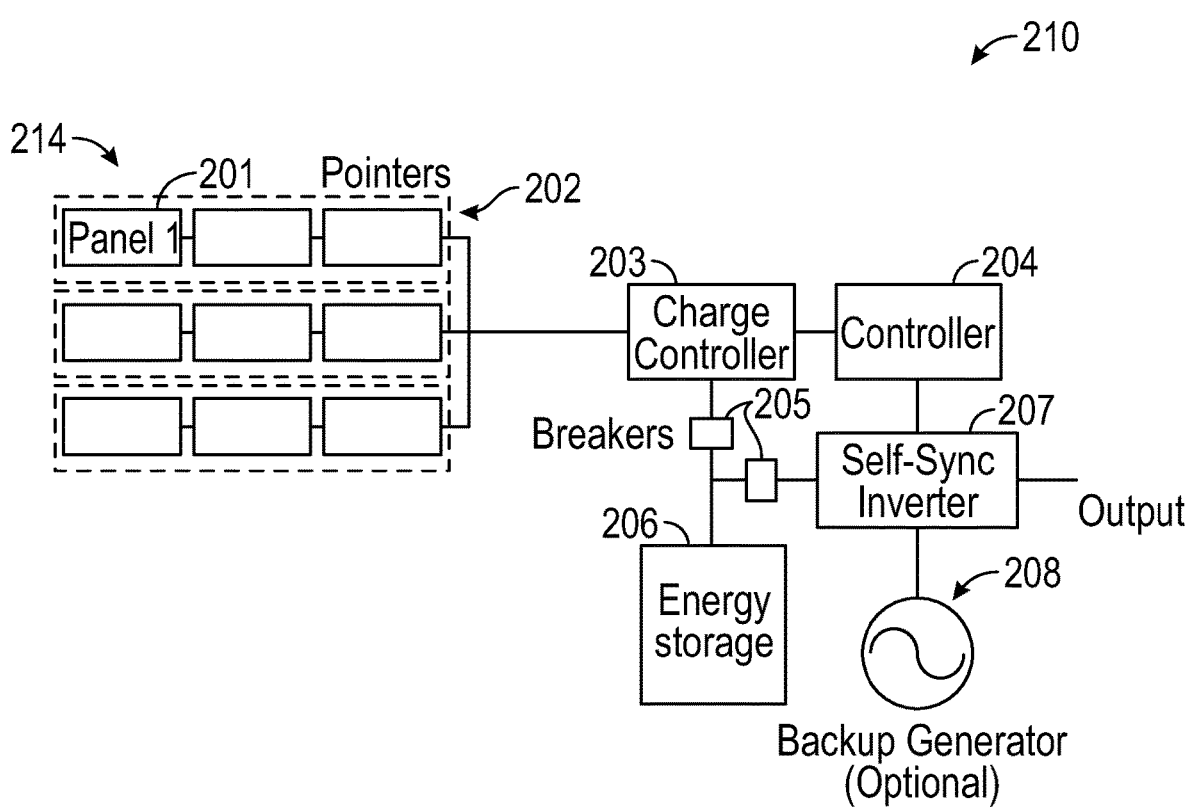
FIG. 2 is a diagram of an embodiment of a fundamental power module (building block), according to one embodiment of the present disclosure, capable of self-synchronizing.

FIG. 2 illustrates a diagram of an embodiment of a core module 210, according to one embodiment of the present disclosure, capable of the self-synchronizing. The core module 210 can be a fundamental power module (or building block) of a power system, such as a modular microgrid, according to embodiments of the present disclosure. The core module 210 includes a charge controller 203, a power module controller 204, protection 205 (e.g., breakers), an ES device 206, a self-synchronizing inverter 207, and a backup generator 208, any or all of which may be similar to, analogous to, or identical to the corresponding components of FIG. 1. The core module 210 also includes a solar PV array 214, which is a DER in the illustrated embodiment. The PV array 214 includes one or more panels 201 mounted with solar tracking or solar pointer technology 202.

As can be appreciated, other forms of DERs can be substituted for the solar PV array 214 and utilized in a core module according to the present disclosure. The PV array 214 may provide DC electricity to the charge controller 203. Other forms of DERs may provide AC electricity to the charge controller 203. The DER may be a wind turbine substituted for the PV array 214. A wind turbine is often configured to provide AC electricity. Accordingly, the charge controller 203 may include an AC-DC converter to convert AC electricity to regulated DC electricity.

As previously explained, a core module 210 can be stacked in parallel and automatically sync with a plurality of other core modules to form a microgrid. The self-synchronization capability, as will be explained more fully below, can enable hot-plugging of a core module 210 to connect with an AC power system.

FIGS. 3A and 3B are graphs 300a, 300b illustrating data (e.g., experimental data) demonstrating self-synchronization capability within a few cycles when two self-synchronizing inverters are hot-plugged together. Electric power systems typically operate at 50-60 Hz. The applicable frequency range for the self-synchronizing driver is from close to DC up to several MHz. Fundamentally the self-synchronizing technology is limited only by the high frequency performance of the electrical components.

Self-synchronization between AC signals is achieved using a non-linear or chaotic circuit interaction (e.g., a non-linear characteristic) described in more detail in the various embodiments presented herein. Each self-synchronizing inverter incorporates a non-linear or chaotic circuit that interacts via an interaction signal. The interaction signal may be a voltage or current or a combination thereof. This interaction combined with non-linear or chaotic circuit performance enables the self-synchronizing inverters to naturally self-synchronize. This approach does not rely on master-slave topology or decentralized control systems with intelligence to control the system's voltage and frequency. Synchronization of the voltage, frequency and phase angle is fundamental to maintain stability in an electrical power system. Synchronization leads to proper operation and load sharing capability of whatever sources are in question. The need for synchronization comes about when more than one AC system must interact.

In FIG. 3A, the AC Sinusoidal waveform 310 of a first inverter (e.g., a self-synchronizing inverter) is shown already active at 0 seconds at the start of the graph. The AC waveform 320 of an unsynchronized second inverter (e.g., a self-synchronizing inverter) is connected at 0 seconds. The unsynchronized AC waveform 320 adjusts 321 to align with and match the AC sinusoidal waveform 310. Likewise, the AC Sinusoidal waveform 310 adjusts 311 to align with the unsynchronized AC waveform 320. By the time of 0.05 seconds, both waveforms 310 and 320 have substantially if not completely aligned and now comprise a single combined waveform 330. When interacting, in terms of power, the final output 330 will be a combination of the power produced or consumed by each AC system. In this example each AC system is a producer.

In FIG. 3B, the AC Sinusoidal waveform 350 of a first inverter (e.g., a self-synchronizing inverter) is shown already active at 0 seconds at the start of the graph. The AC waveform 360 of an unsynchronized second inverter (e.g., a self-synchronizing inverter) is connected, then switched on at 0 seconds. After being switched on, the unsynchronized AC waveform 360 adjusts 361 to align with and match the AC sinusoidal waveform 350. Likewise, the AC Sinusoidal waveform 350 adjusts 351 to align with the unsynchronized AC waveform 360. By the time of 0.05 seconds, both waveforms 350 and 360 have substantially if not completely aligned and now comprise a single combined waveform 370.

Figure 4:
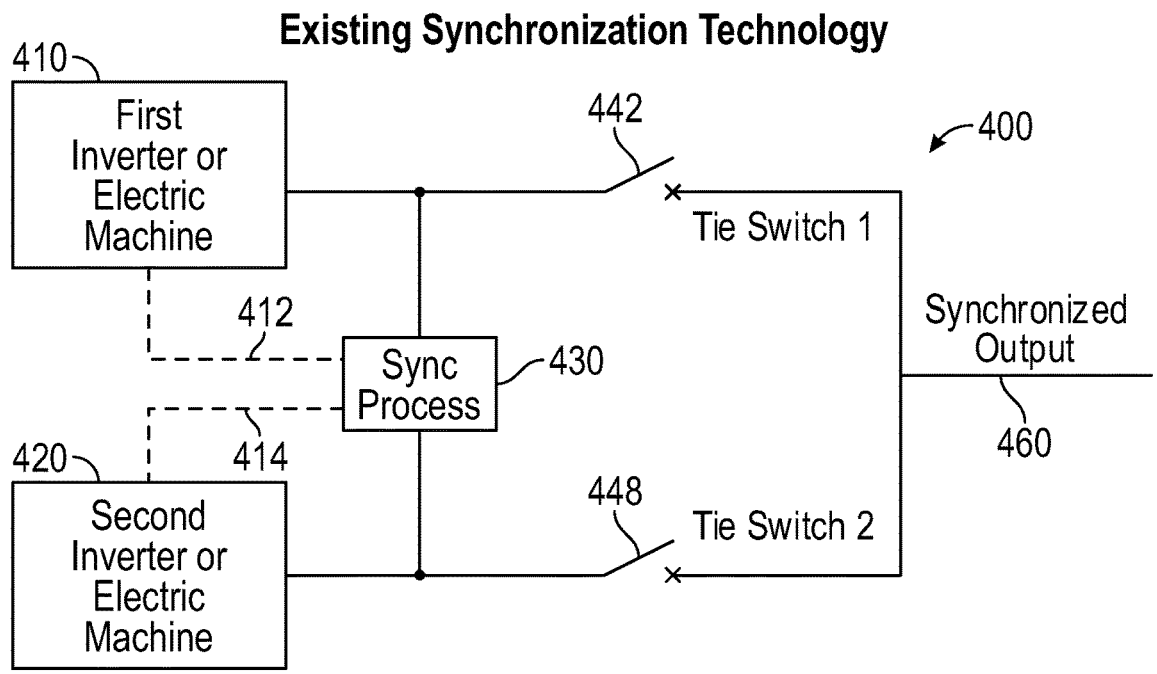
FIG. 4 illustrates a circuit with presently available existing synchronization technology.

FIG. 4 is a circuit diagram of an existing synchronization technology. An electrical system 400, symbolically illustrated in FIG. 4, shows how inverter synchronization is traditionally done. A synchronization process 430 must be applied to provide synchronizing capability. The synchronization process 430 shown can involve using a synchronizer, for synchronizing a first inverter or electric machine 410 with a second inverter or electric machine 410.

In the traditional inverter design shown in this example embodiment, the synchronizing process 430 typically comprises a DC-AC converter. The implementation and operation of synchronizing the inverters requires inverters 410, 420 to be synchronized using data communicated over connections 412 and 414 prior to connecting switches 442 and 448.

The synchronizing process must be carefully controlled so that the inverter out can ensure proper synchronization of the output waveform to grid voltage, frequency, and phase prior to connecting power via switches 442 and 448. In many inverter designs, a phase-locked loop (PLL) provides the mechanism at the heart of this synchronization process. Other methods of synchronizing are known.

In its basic form, an array of sensor elements are required including, for example, a grid-synchronization PLL combining a phase detector (PD), filter, and voltage-controlled oscillator (VCO). Here, the PLL PD compares the VCO output with the grid voltage and adjusts VCO output to match the grid.

In its simplest form, a suitable PLL senses the phase of a reference signal and adjusts the phase of a control signal to ultimately synchronize one to the other. The sensed inputs and output waveforms must be constantly monitored and adjusted to ensure that the waveforms remain synchronized.

Figure 5:
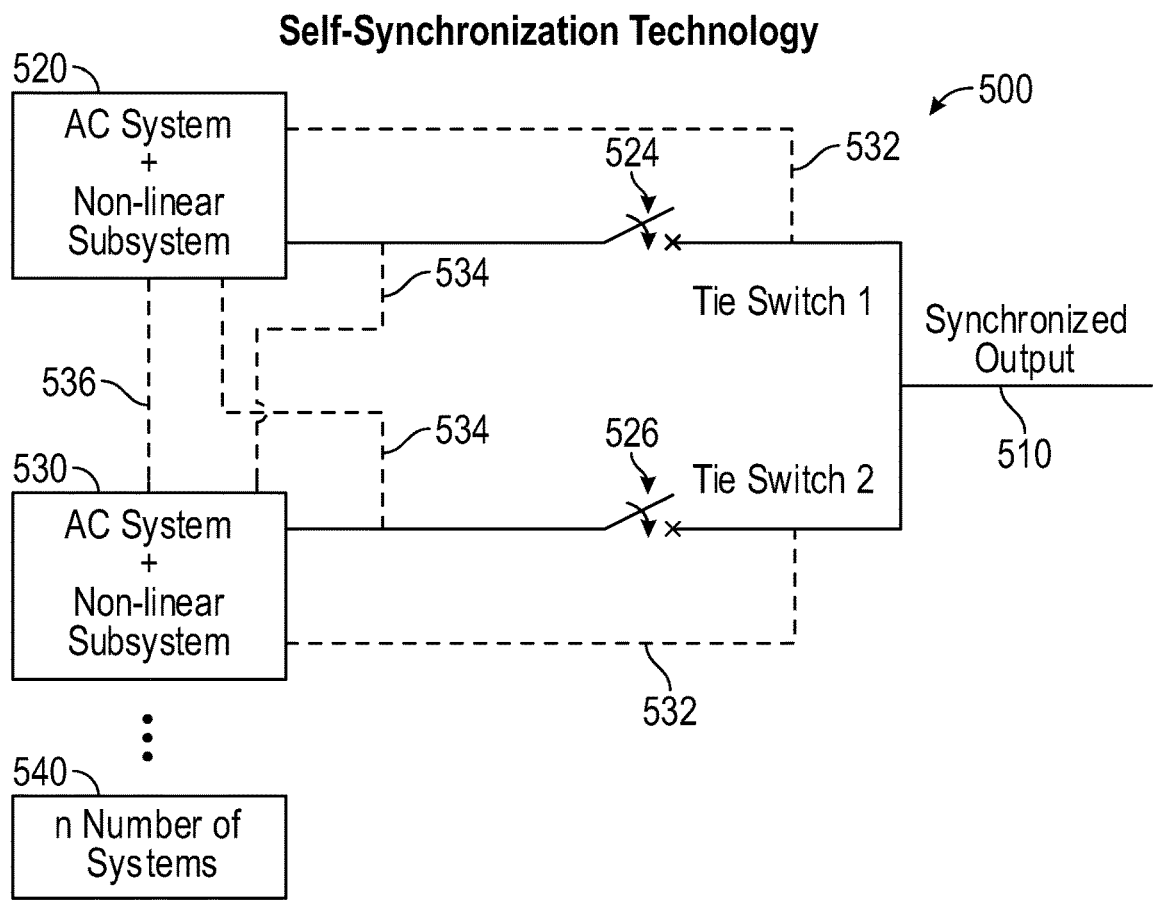
FIG. 5 is a diagram of a self-synchronization circuit, according to one embodiment of the present disclosure, illustrating the interconnection of n number of arbitrary systems.

FIG. 5 illustrates a diagram of a system 500 of self-synchronizing systems 520, 530, 540 (e.g., electrical devices or subsystems). The self-synchronizing systems 520, 530, 540 include a self-synchronization capability and/or circuit, according to one embodiment of the present disclosure. Both non-linear and chaotic systems are individually capable of operating with synchronous behavior. An electrical system 520 that can produce non-linear or chaotic behavior can be synchronized to another non-linear or chaotic electrical system 530 with only a reference connection 532, 534, 536, such as a voltage and/or current, between the two systems 520, 530, as illustrated in FIG. 5. Also illustrated in FIG. 5 is the capability of the self-synchronizing technology to be connected in various ways. This is illustrated via a connection 536 system 520 to system 530, a connection 534 from system output, and a connection 532 from the grid. In essence all that needs to occur is for the non-linear or chaotic systems 520, 530 to interact in order to achieve synchronization. This synchronization can be extended to an arbitrary number of systems 540, as illustrated.

Self-synchronization of output AC signals is achieved using a non-linear or chaotic circuit interaction via the reference connections 532, 534, 536 shown in FIG. 5. Each system 520, 530, 540 incorporates a non-linear or chaotic capability or characteristic that interacts via an interaction signal 532, 534, 536. The non-linear or chaotic capability or characteristic may comprise or otherwise be implemented as a non-linear or chaotic circuit or simulation thereof. The interaction signal 532, 534, 536 may be a voltage or current or a combination thereof. This interaction via the interaction signal 532, 534, 536 combined with the non-linear or chaotic capability performance enables the systems 520, 530, 540 to naturally self-synchronize.

This approach to synchronization does not rely on master-slave topology or decentralized control systems with intelligence to control the system's voltage and frequency. As noted, synchronization of the voltage, frequency and phase angle is fundamental to maintain stability in an electrical power system. Synchronization leads to proper operation and load sharing capability of whatever sources are in question. Accordingly, this new approach to synchronization is significant.

The diagram of FIG. 5 illustrates an interconnection of n number of arbitrary systems 540, according to embodiments of the present disclosure. Each additional arbitrary system 540 of the n number can be connected in parallel to the synchronized output and to an adjacent system (e.g., system 530) in a similar manner as shown for system 520 and system 530. The need for synchronization comes about when more than one AC system must interact, such as at the synchronized output 510. When interacting, in terms of power, the final synchronized output 510 will be a combination of the power produced or consumed by each AC system 520, 530, 540. In this example each AC system 520, 530 is a producer (e.g., a generation source), and one or more the n arbitrary systems 540 may also be producers. Thus, the desired output 510 is an additive combination of the power produced from each AC system 520, 530, 540. When adding multiple AC waves, a highly desirable outcome is an efficient combination of energy, one where little to no energy is lost in the combination process.

Focusing strictly on the synchronization of two systems 520, 530 to each other, by synchronizing the AC waves, their combined power output 510 can be maximized. This means that the AC output of AC systems 520 and 530 are synchronized before the tie switches 524 and 526 are closed. The tie switches 524 and 526 allow the power output of each AC system 520 and 530 and/or 510 if the systems are synchronizing to the grid where 510 would act as a grid connection, to remain isolated until their AC waves are synchronized or disconnect in the case of a fault. Tie switches 524 and 526 can include, but are not limited to, manual breakers, automatic transfer switches, computer-controlled breakers, and any method or device by which a connection can disconnect and reconnect.

The AC systems 520 and 530 can use a variety of connections, including connections 532, 534, 536, to enable self-synchronization. Using the non-linear subsystem, connection 536 serves as a subsystem-to-subsystem direct connection to achieve synchronization. Connection 534 is a subsystem to AC system power output connection where the subsystem can use the power output of any other AC system as a reference to self-synchronize to. Connection 532 is a subsystem to AC reference connection where the subsystem can use any AC reference, such as the grid, to self-synchronize to. The AC systems 520 and 530 can be parallel to n number of systems 540 where n is any positive integer number.

Figure 6:
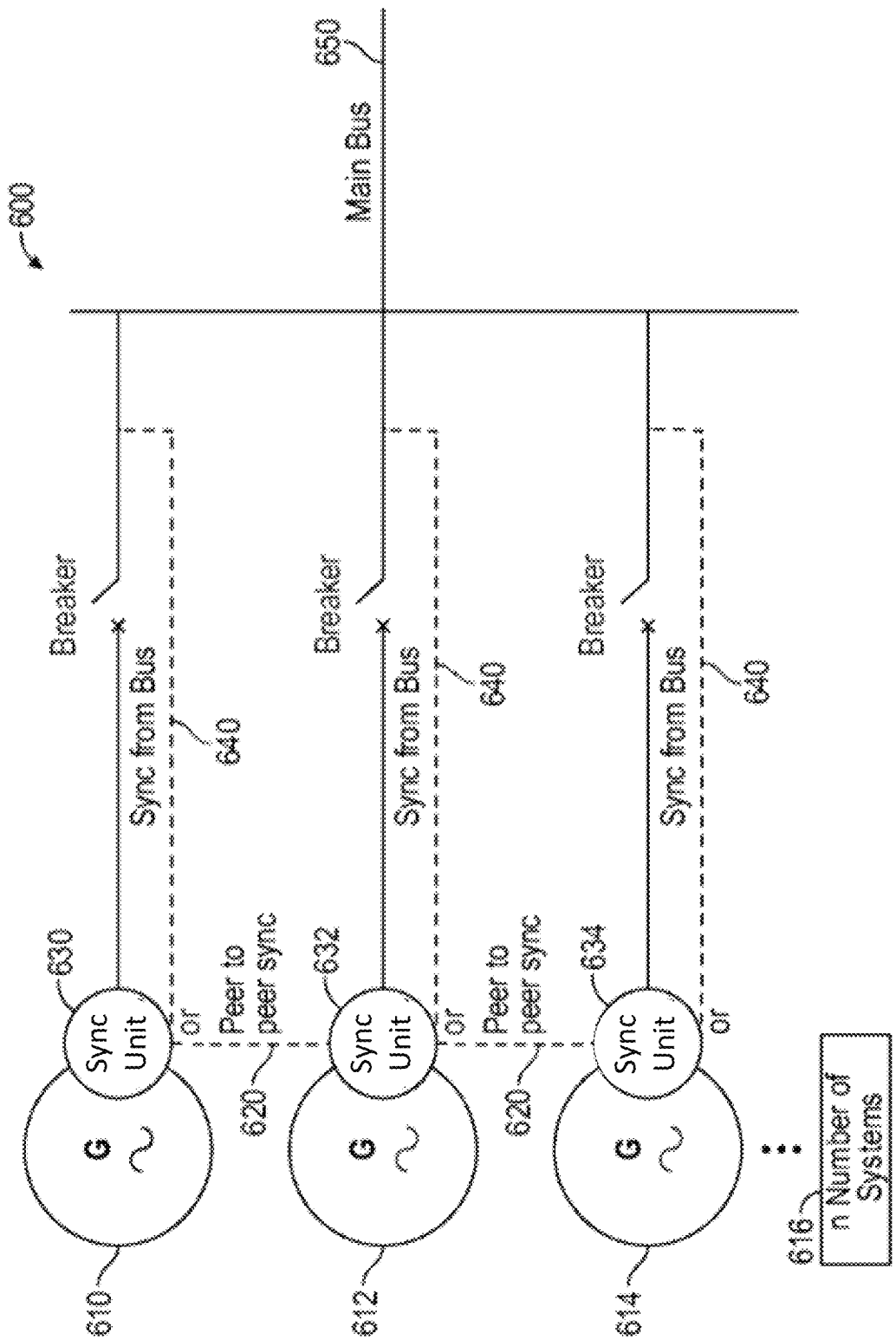
FIG. 6 is a diagram of an electrical system including an embodiment of a self-synchronizing driver, according to the present disclosure, in application to generators.

FIG. 6 is a diagram of an electrical system 600 including self-synchronizing drivers 630, 632, 634 (e.g., sync units 630, 632, 634), according to one embodiment of the present disclosure. FIG. 6 illustrates the self-synchronizing drivers 630, 632, 634 utilized in synchronizing the parallel operation of generators. Three generators 610, 612, 614 are self-synchronized to each other by peer-to-peer sync connection 620, which provides an interaction signal. This arrangement, like the microgrid of FIG. 1, is expandable to any number of systems, denoted by an arbitrary n number of generators 616. The self-synchronizing control is implemented into a sync control 630, 632, 634 in each generator.

Actual synchronization between the generators and in some cases, the centralized grid, can be achieved in a variety of ways. Synchronizing connection 620, which provides an interaction signal, serves as a subsystem-to-subsystem direct connection to achieve synchronization. Connection 640 is a subsystem to AC reference (e.g., an interaction signal). Connection 650 is also a connection that a subsystem can use to obtain an AC reference (e.g., an interaction signal), such as the grid or another generator power output, to self-synchronize to.

Figure 7A:
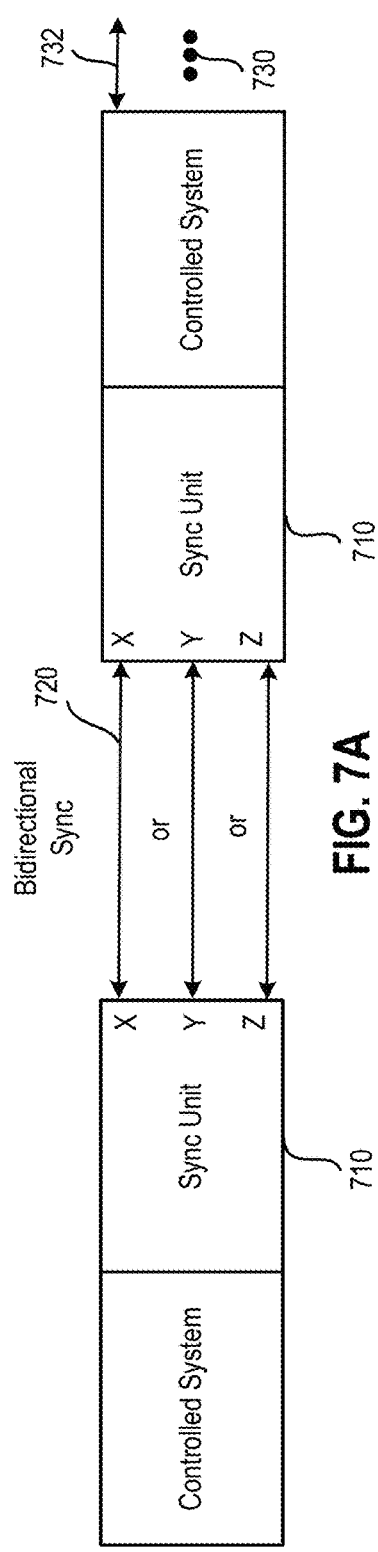
FIG. 7A illustrates bidirectional synchronization, according to some embodiments of the present disclosure.

FIG. 7A illustrates an embodiment of bidirectional synchronization of systems. Interconnection methods of non-linear systems (e.g., synchronization units, synchronization drivers) to achieve self-synchronization are illustrated in FIG. 7A. The sync unit 710 can interconnect, which leads to self-synchronization, with X, Y, or Z reference, which are a voltage and/or current reference on each system via the bidirectional interconnection 720. An example of this interconnection is an X to X voltage connection, where the X voltage node of each system is connected and the systems self-synchronize. This self-synchronization can apply to n number of systems 730 where n is any positive integer number. The bidirectional interconnection 732 allows the n number of systems to exchange information, in the form of voltage and/or current, between systems.

Figure 7B:
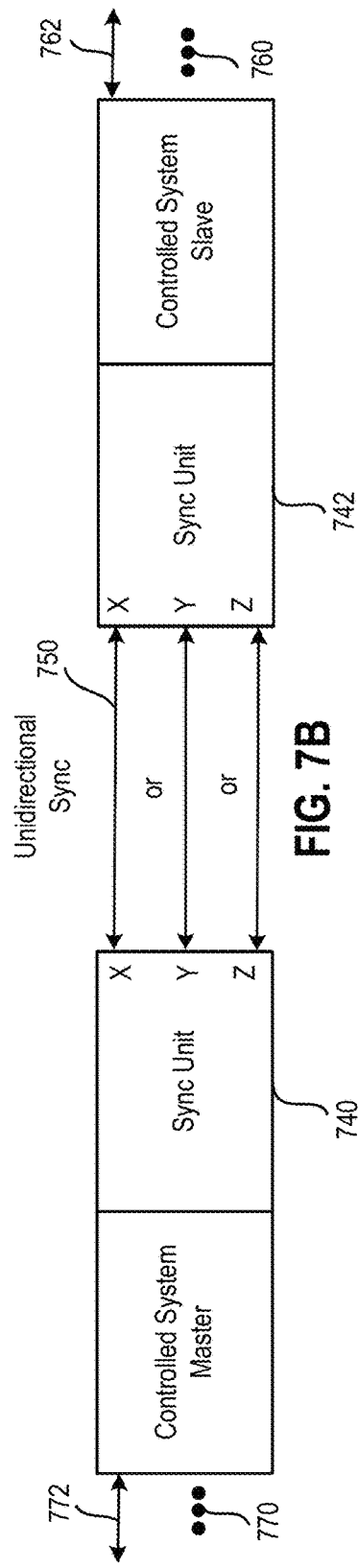
FIG. 7B illustrates unidirectional synchronization, according to some embodiments of the present disclosure.

FIG. 7B illustrates an embodiment of unidirectional synchronization of systems. Interconnection methods of non-linear systems (e.g., synchronization units, synchronization drivers) to achieve self-synchronization are illustrated in FIG. 7B. A master sync unit (e.g., a non-linear master subsystem) 740 can interconnect with a slave sync unit (e.g., a non-linear slave subsystem) 742, which leads to self-synchronization, with X, Y, or Z reference, which are a voltage and/or current reference on each system via the unidirectional sync 750. An example of this interconnection is an X to X voltage connection, where the X voltage node of each system in connected and the systems self-synchronize. This self-synchronization can apply to n number of systems 760 where n is any positive integer number. Bidirectional interconnection 762 allows the n number of systems to exchange information. The unidirectional interconnection 750 restricts the directionality of information to one direction, which results in self-synchronization in a master-slave configuration, where the master sync unit 740 becomes the voltage and/or current reference that the other systems self-synchronize to. This self-synchronization can apply to n number of systems 770 connected to master sync unit 740 where n is any positive integer number. A unidirectional interconnection 772 allows the n number of systems to exchange information.

Figure 8:
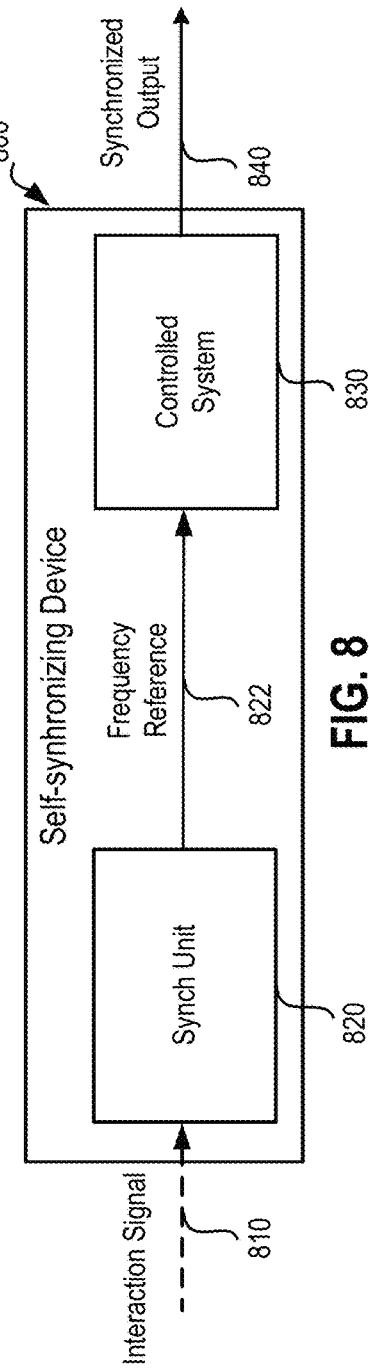
FIG. 8 illustrates an example of a self-synchronizing device, according to an embodiment of the present disclosure.

FIG. 8 illustrates an example of a self-synchronizing device 800, including a sync unit 820 (e.g., a non-linear system) coupled to a controlled system 830 (e.g., an inverter), according to an embodiment of the present disclosure. FIG. 8 illustrates an input 810 (e.g., an interaction signal) and output 822 (e.g., a frequency reference) of the sync unit 820. The output 822, of frequency reference, is provided to the controlled system 830. A current and/or voltage reference from any AC source, including other non-linear systems, provides the input 810 to the sync unit 820. This input 810 is a reference to which the sync unit 820 will synchronize. The sync unit 820 will then supply an output 822, namely a frequency (and phase) reference to the controlled system 830 to use as the frequency (and phase) of its synchronized output 840.

Figure 9:
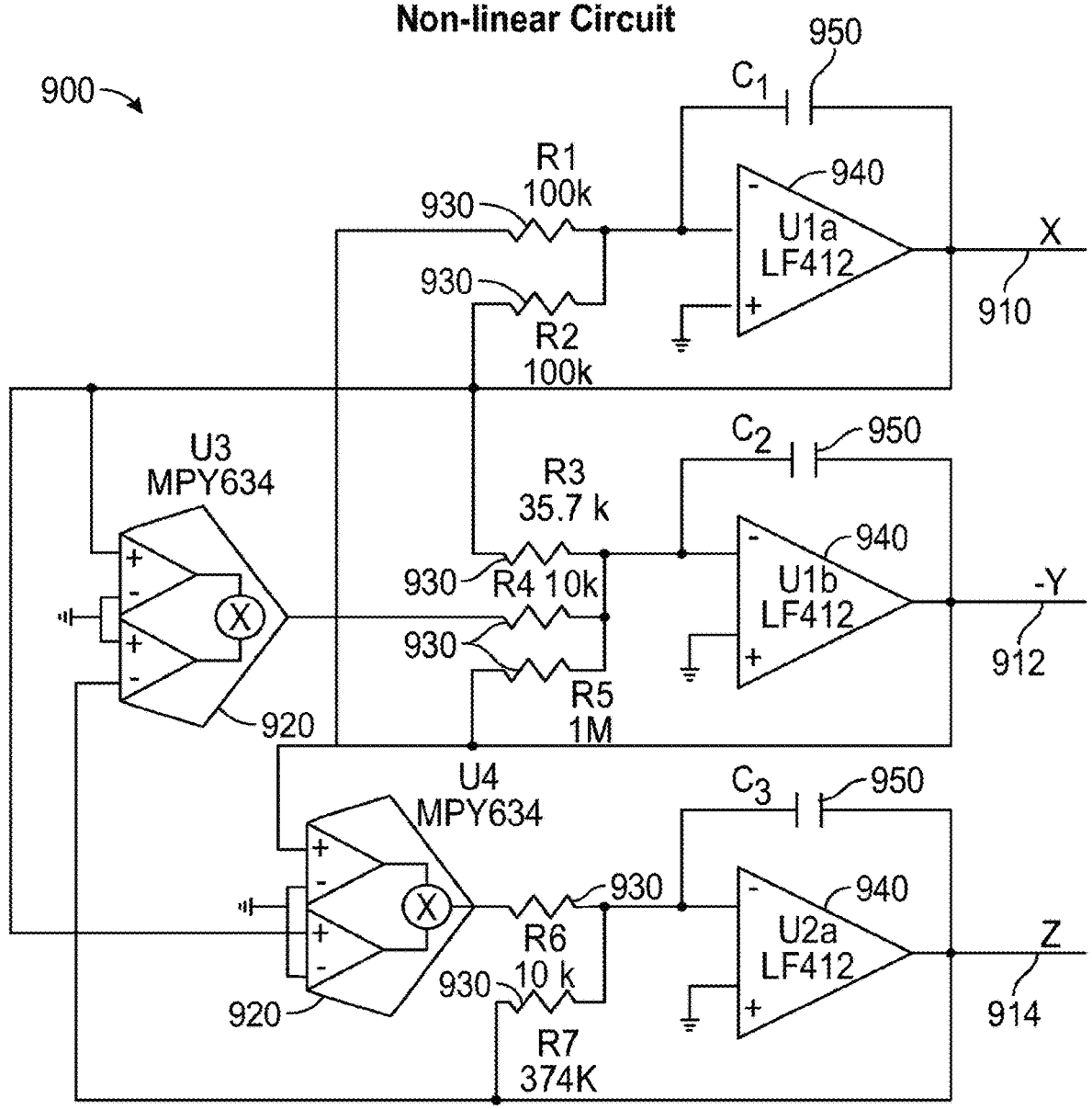
FIG. 9 is a circuit diagram of a non-linear circuit of a synchronization unit, according to an embodiment of the present disclosure.

FIG. 9 is a circuit diagram of an example synchronization unit including a non-linear circuit 900, according to an embodiment of the present disclosure. This example embodiment of a non-linear circuit 900 is based off a Lorenz system which outputs voltage and/or current references X, −Y, and Z shown as inputs and outputs 910, 912, 914. This illustrated embodiment of a nonlinear circuit 900 includes energy storage components in the form of capacitors 950, locally active resistance in the form of resistors 930, and non-linear elements in the form of a combination of multipliers 920, such as an MPY634. The circuit 900, with this set of components, is capable of non-linear and chaotic behavior. The capacitors 950 resistors 930, R1-R7, shown are simply examples and other forms of energy storage components and/or resistance could be used, in other embodiments. Similarly, while the arrangement of multipliers 920 provides nonlinearity to the circuit 900, in other embodiments of nonlinear circuits a different form of nonlinear element may be provided. The circuit 900 also includes op-amp devices 940 such as an LF412. By changing the value of the capacitors 950, the frequency output at the output X 910, output −Y 912, and output Z 914 of the system 900 can be adjusted.

Figure 10:
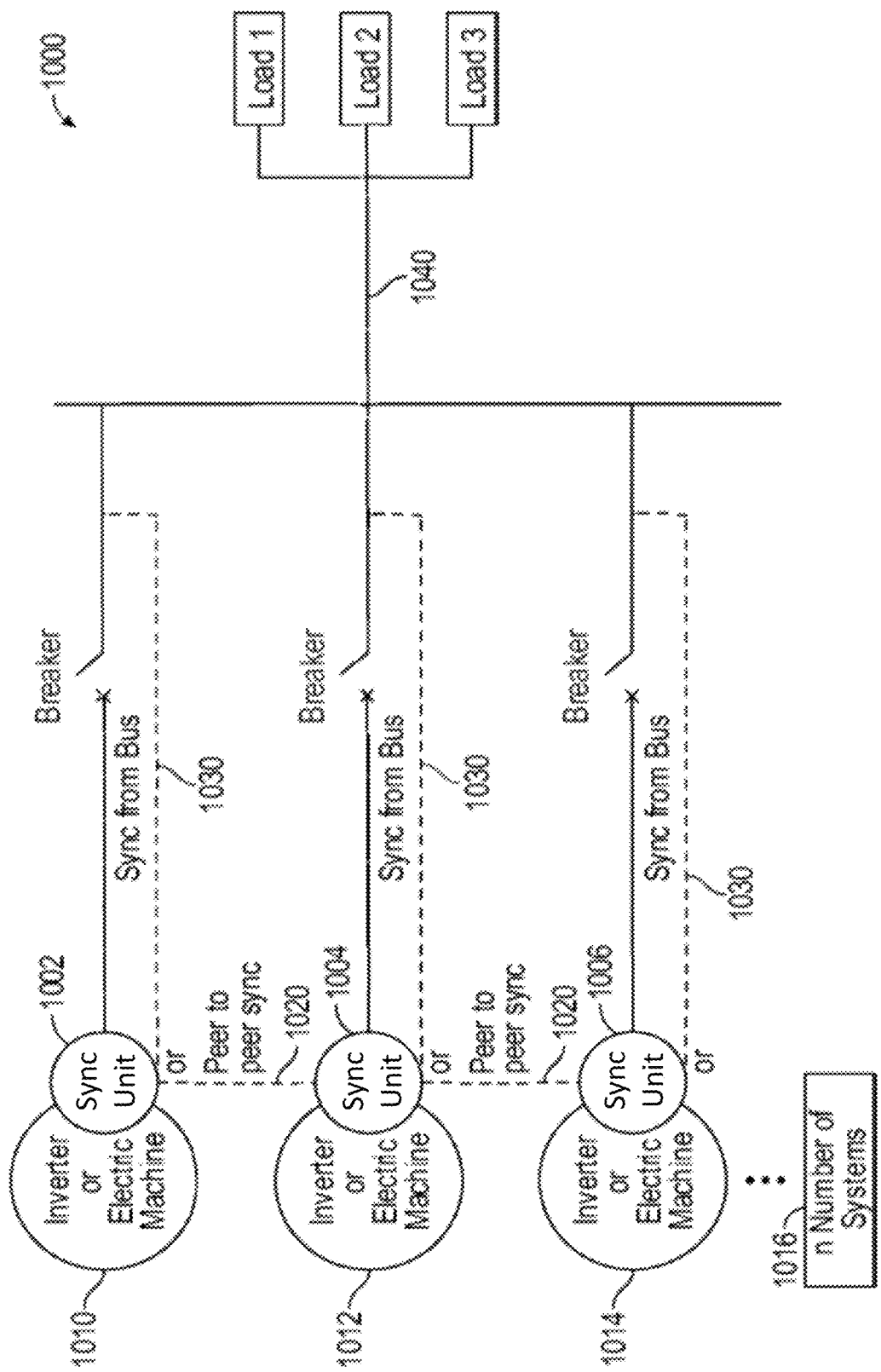
FIG. 10 is a diagram of an electrical system including an embodiment of a self-synchronizing driver, according to an embodiment of the present disclosure, in application to grid-forming electric machines.

FIG. 10 is a diagram of an electrical system 1000 including an embodiment of a self-synchronizing driver 1002, 1004, 1006 (e.g., sync unit), according to an embodiment of the present disclosure. The self-synchronizing drivers 1002, 1004, 1006 (e.g., sync units) are utilized in application to grid-forming electric machines 1010, 1012, 1014. This embodiment includes three electric machines 1010, 1012, 1014 that are self-synchronized to each other. This arrangement, similar to that of the microgrid, is expandable to any number of systems, denoted by an arbitrary n number of generators 1016. FIG. 10 illustrates one possible arrangement and/or use of the self-synchronizing driver 1002, 1004, 1006 within a multi-source formed grid (electrical system 1000) powering multiple loads. The electric machines 1010, 1012, 1014 can use a variety of connections, including peer-to-peer sync connections 1020, to enable self-synchronization. Connection 1030 is a subsystem-to-bus output connection where the subsystem can self-synchronize via the Bus 1040.

Figure 11:
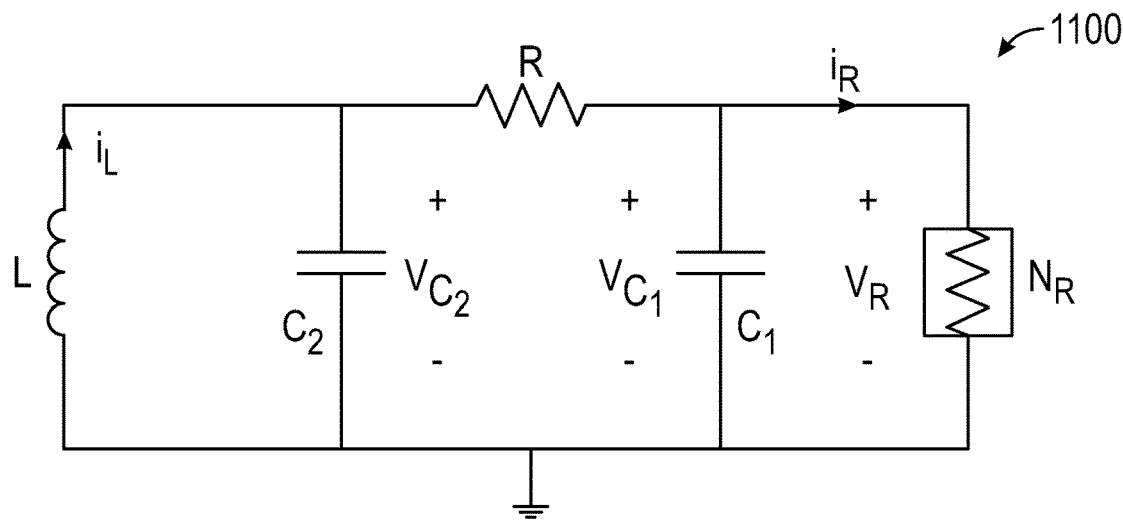
FIG. 11 is a circuit diagram of a Chua Circuit, according to one embodiment.

FIG. 11 is a circuit diagram of an Ideal Chua Circuit 1100, which may be utilized in a synchronization unit to implement or otherwise provide a non-linear characteristic or chaotic characteristic for the synchronization unit to enable self-synchronization capability. The circuit 1100 shown in FIG. 11, which demonstrates the self-synchronizing of chaotic systems, is made up of capacitors, resistors, inductors, and the non-linear Chua diode $N_R$. This embodiment provides a Chua circuit that is capable of chaotic and limit-cycle behavior.

Figure 12:
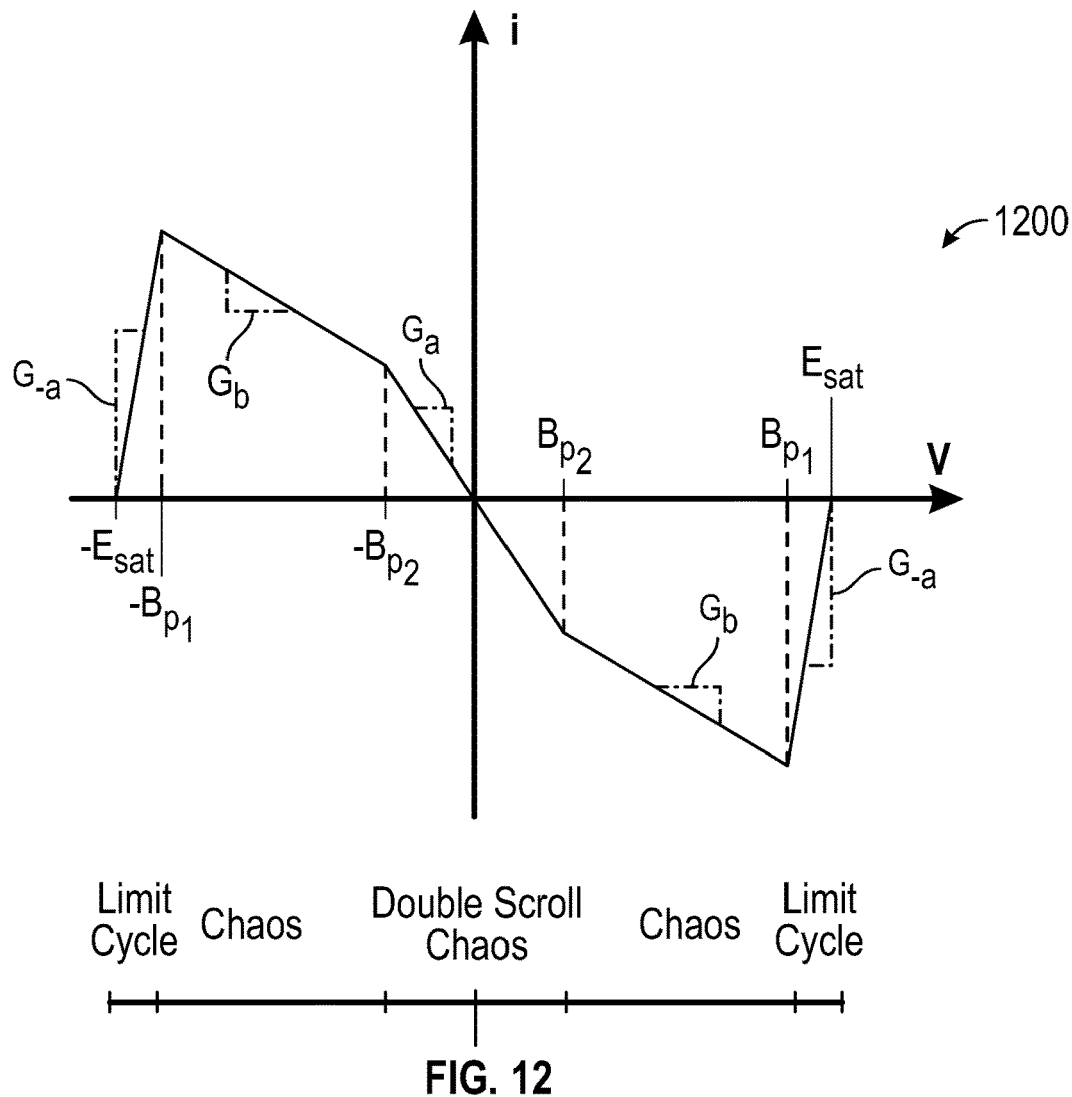
FIG. 12 is a graph showing current (I) and voltage (V) characteristics of the Chua diode or non-linear resistor $N_R$.

FIG. 12 is a graph 1200 illustrating current (I) and voltage (V) characteristics of a Chua diode or non-linear resistor $N_R$. The graph 1200 also indicates regions of the limit-cycle behavior with a designation of the slope G-a. The limit-cycle behavior of a circuit may be desired for inverter synchronization, according to embodiments of the present disclosure. Thus, the stable limit-cycle operating range, between BP1 and BP2 in FIG. 12, is maximized. The breakpoints of FIG. 12 serve as transition points between piecewise linear regions (and correspondingly different operation states) and are responsible for non-linear behavior.

Figure 13:
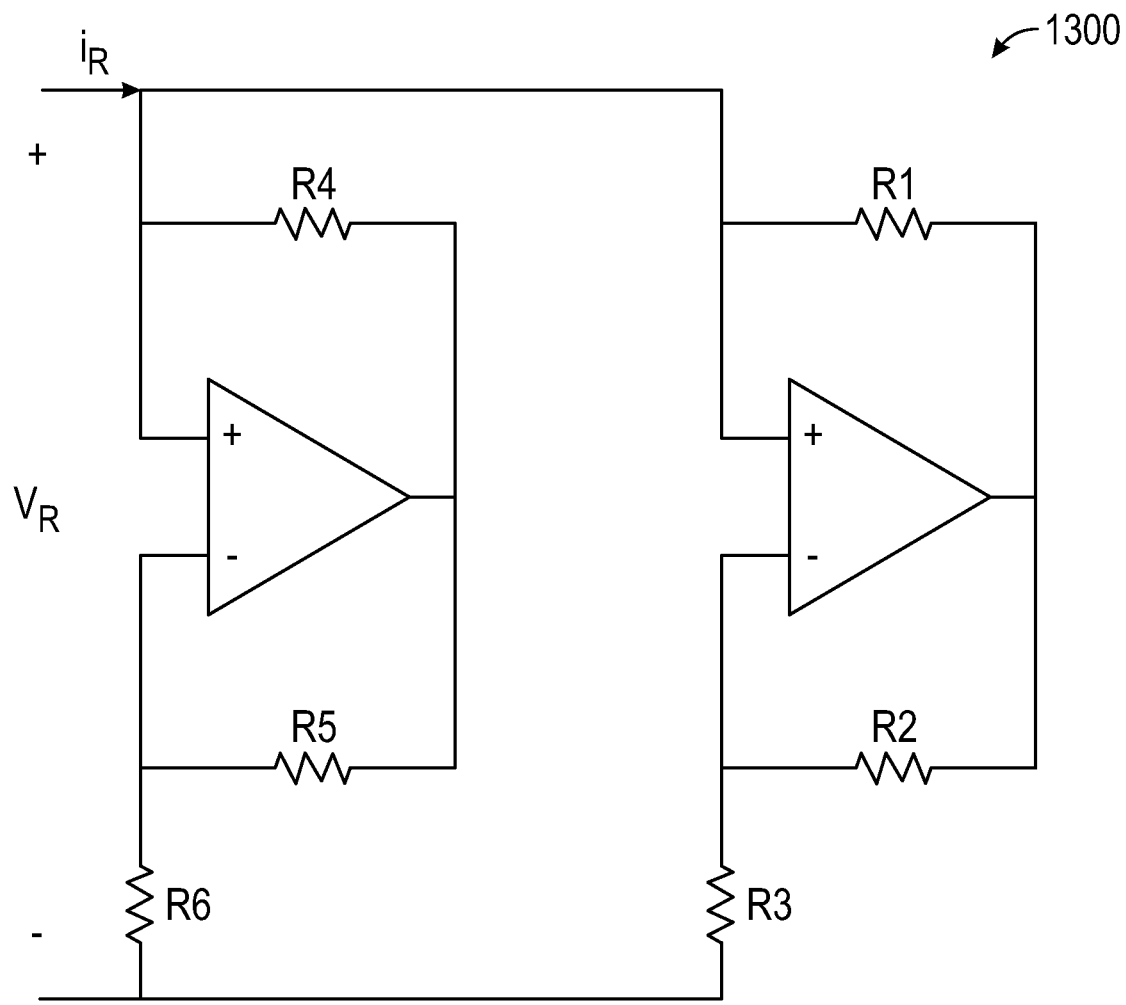
FIG. 13 is a circuit diagram of an op-amp topology, according to one embodiment, that produces the breakpoints of FIG. 12.
Figure 14A:
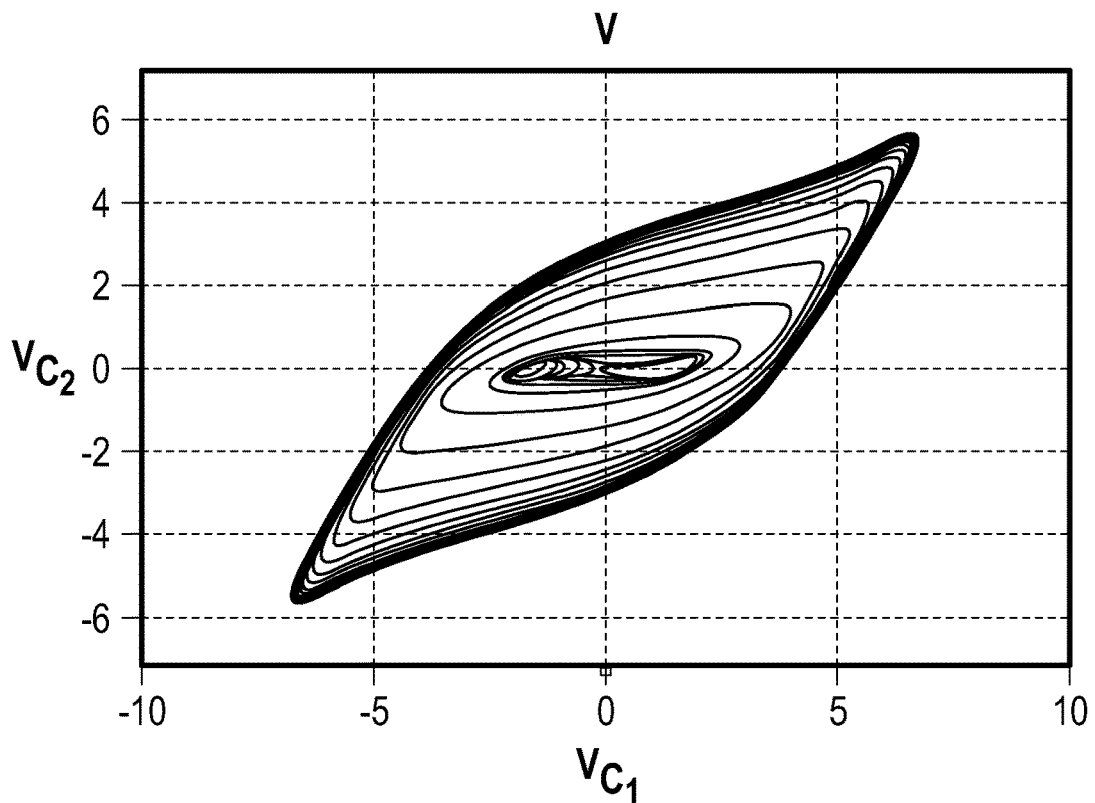
FIGS. 14A-D are graphs demonstrating the effects of an internal resistance of an inductor on the performance of a Chua circuit at various values of resistance.
Figure 14B:
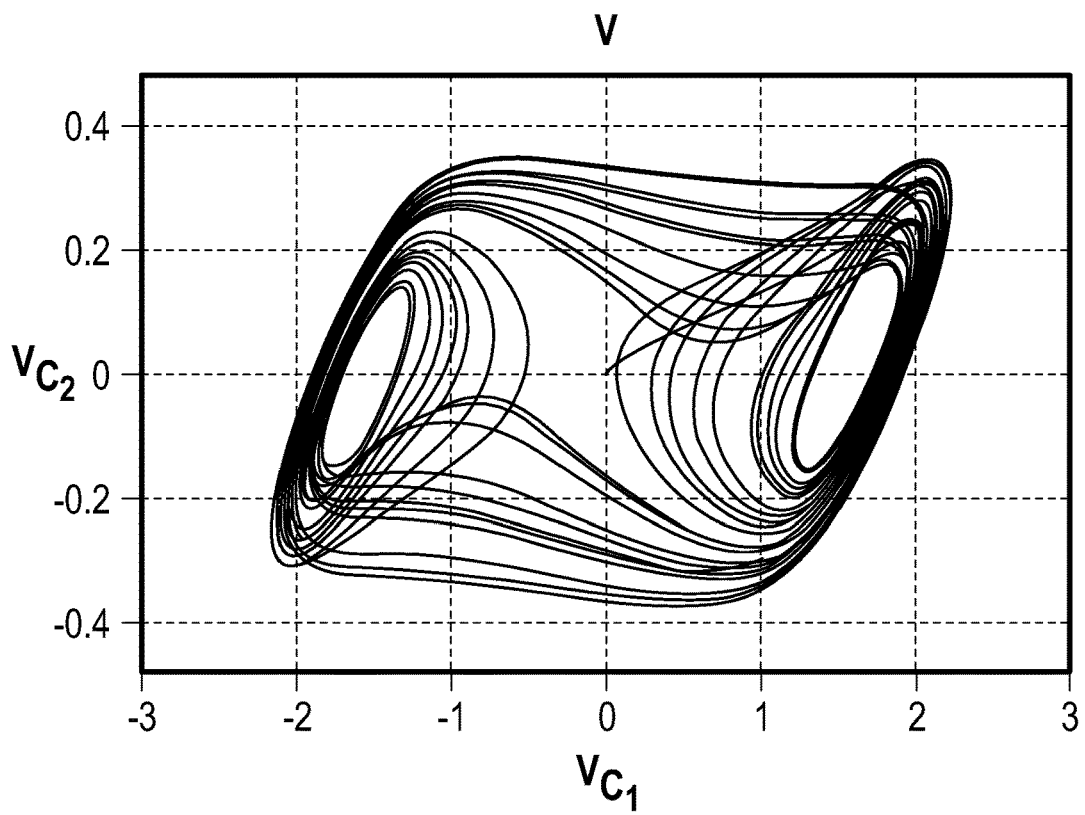
Figure 14C:
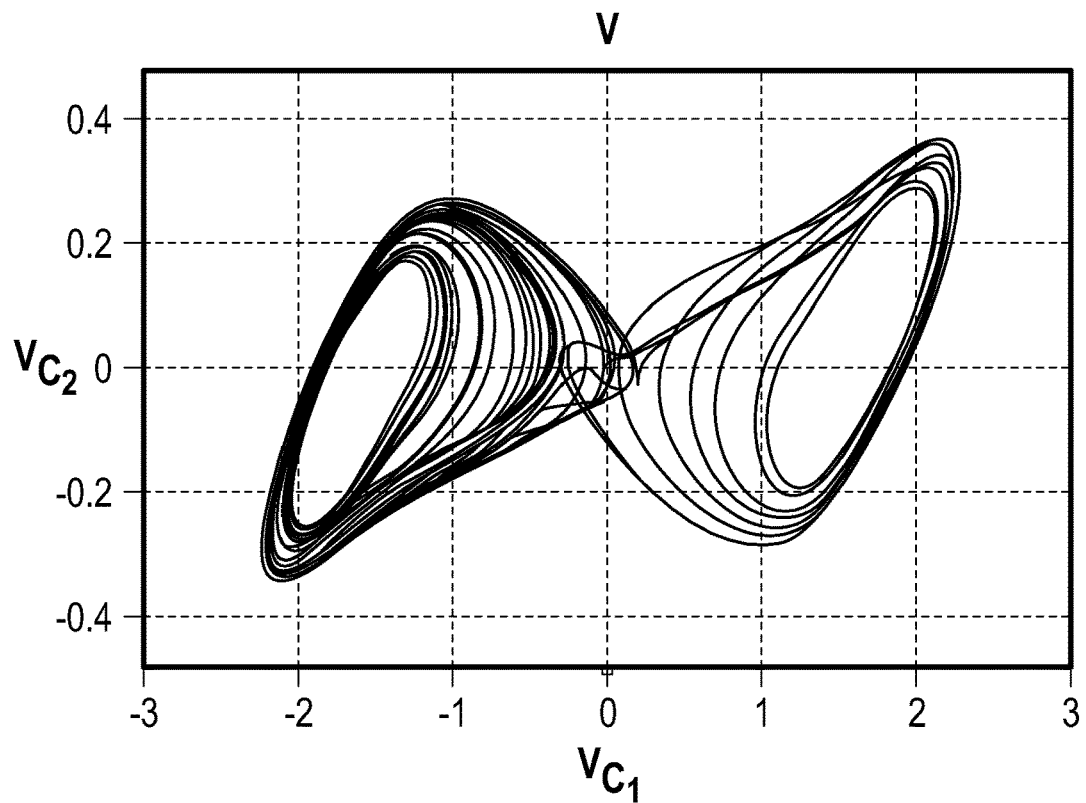
Figure 14D:
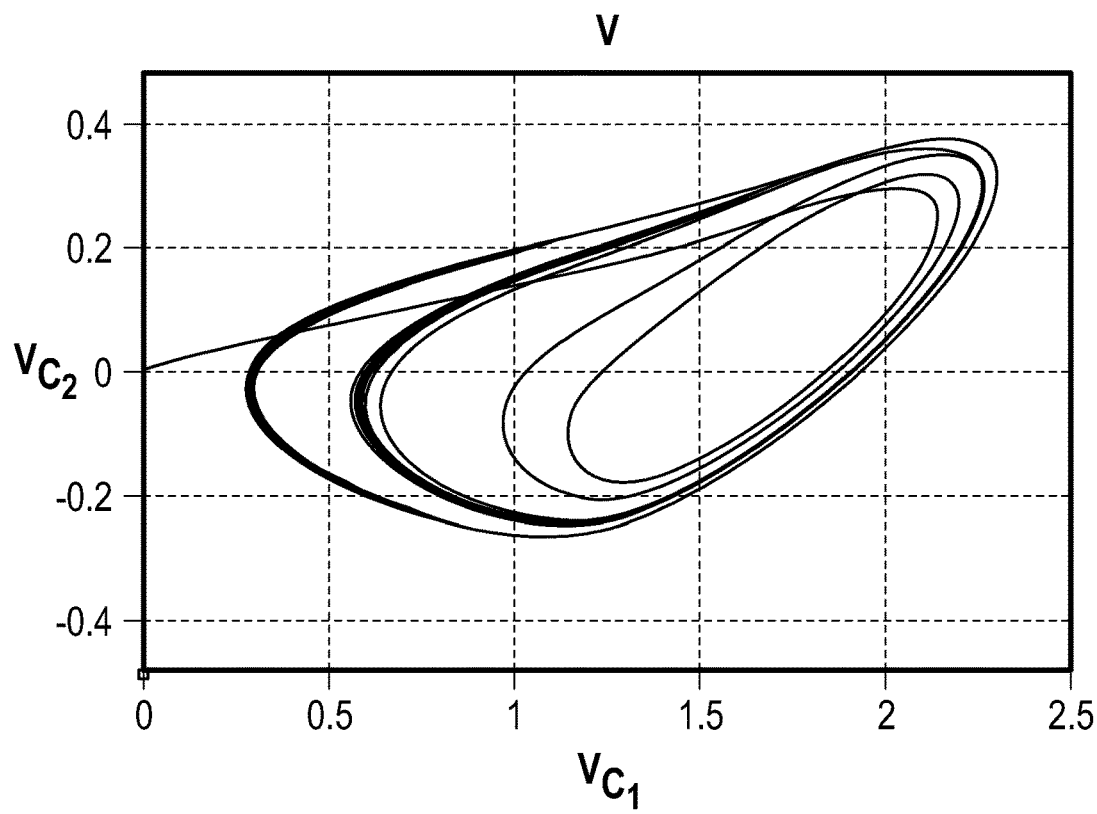

FIG. 13 is a circuit diagram of an Op-Amp 1300 having a topology that produces the breakpoints of FIG. 12. Stated otherwise, the Op-Amp 1300 is configured to realize the relationship illustrated in FIG. 12. The breakpoints serve as a transition point between piecewise linear regions and corresponding operation states. The Op-Amp topology described and illustrated in this diagram of the Op-Amp 1300 is used for realizing the non-linear resistor of the Chua circuit. As a bifurcation parameter B varies, the Chua circuit transitions from chaos to a stable limit-cycle operation. The bifurcation parameter is: $B=C_2(R^2/L)$. Similarly, the inductor-less Chua circuit transitions can be achieved by varying the resistance R in β. The stable limit-cycle is a periodic state that is ideal for synchronizing inverters. By design, an embodiment of the inductor-less Chua circuit will operate in the limit-cycle region with a frequency of 60 Hz, which can be crucial for a microgrid's operation.

FIGS. 14A-D are graphs demonstrating the effects of an inductor's internal resistance, $R_{Lint}$, on the performance of a Chua circuit at various resistor values. For example, the Chua circuit 1100 of FIG. 11 includes an inductor L. FIG. 14 shows the effect of the inductor's internal series resistance $R_{Lint}$ on performance for frequencies below 1 kHz. When designing the ideal Chua circuit, such as shown in FIG. 11, with a physical inductor, the internal series resistance $R_{Lint}$ of the inductor L may be considered. The internal resistance $R_{Lint}$ of the inductor can have a dramatic effect on the operation of the Chua circuit and the ability of the circuit to operate at lower frequencies.

For example, a 0.1 ohm change can cause a different behavior. If $R_{Lint}$ is 0.2 ohms and is transitioned to 0.3 ohms, the circuit 1100 of FIG. 11 transitions from limit-cycle behavior of FIG. 14A to double scroll behavior of FIG. 14B. FIGS. 14A-D also illustrate how the behavior changes from double scroll chaos in FIG. 14C to chaos in FIG. 14D when the internal resistance $R_{Lint}$ is changed from 0.7 ohms to 0.8 ohms. Thus, even a relatively small change of 0.1 ohms in the internal resistance of the inductor can cause dramatic shifts in the performance of the Chua circuit. Accordingly, it is important to note the effects of the internal series resistance $R_{Lint}$ as a driving factor for the design choice of Chua circuits below 1 kHz. Due to the cost, size, and typical internal series resistance of commercially available inductors needed for 50-60 Hz operation of the Chua circuit, as well as the advantage of adjusting inductance for frequency scaling, a gyrator that emulates the inductor L can be utilized. The gyrator can offer degrees of freedom for adjusting the frequency and series resistance in a simple Op-Amp configuration. The gyrator can be critical for practical operation below 1 kHz. A gyrator including a single Op-Amp, two resistors, and a capacitor can act as an inductor with inductance, L.

Figure 15:
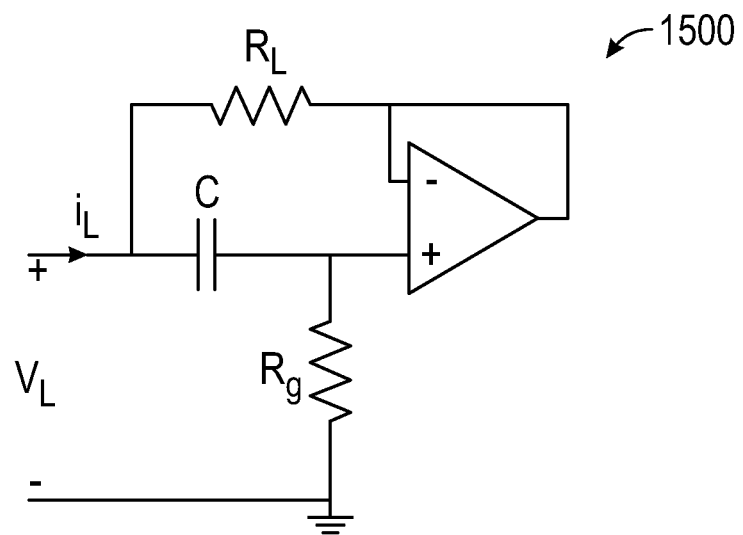
FIG. 15 is a circuit diagram of a gyrator topology used to emulate an inductor, according to one embodiment.

FIG. 15 is a circuit diagram of a gyrator 1500 having a topology that can be used to emulate an inductor. The gyrator 1500 implementation of FIG. 15 is ground-referenced, which works well to emulate an inductor in the Chua circuit as the inductor in the Chua circuit likely is also ground-referenced. The equivalent inductance of this op-amp circuit is derived from the state variables of the gyrator 1500.

Figure 16:
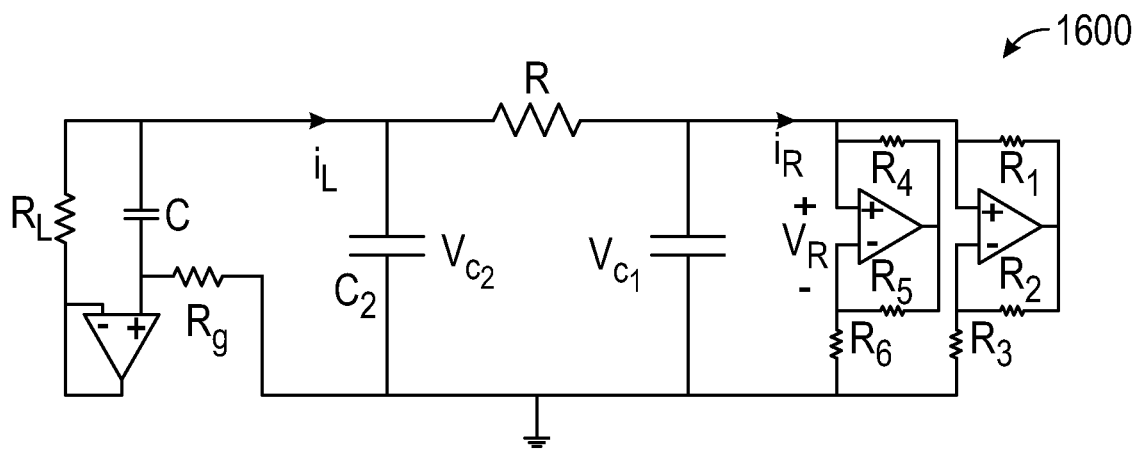
FIG. 16 is a circuit diagram of an inductor-less Chua circuit, according to one embodiment, with emulated inductance and non-linear resistance.

FIG. 16 is a circuit diagram of an inductor-less Chua circuit with emulated inductance and non-linear resistance, according to one embodiment, which may be utilized in a synchronization unit to implement or otherwise provide a non-linear characteristic or chaotic characteristic for the synchronization unit to enable self-synchronization capability. An inductor-less Chua circuit realized with Op-Amps is illustrated in FIG. 16. This implementation of a Chua circuit can be constructed using only three Op-Amps along with three capacitors and nine resistors, which is an improvement on previously reported inductor-less Chua circuits. The Op-Amp implementation of the Chua circuit allows for a very wide range of selectable operating frequencies and is able to operate in chaotic and limit-cycle modes.

Figure 17A:
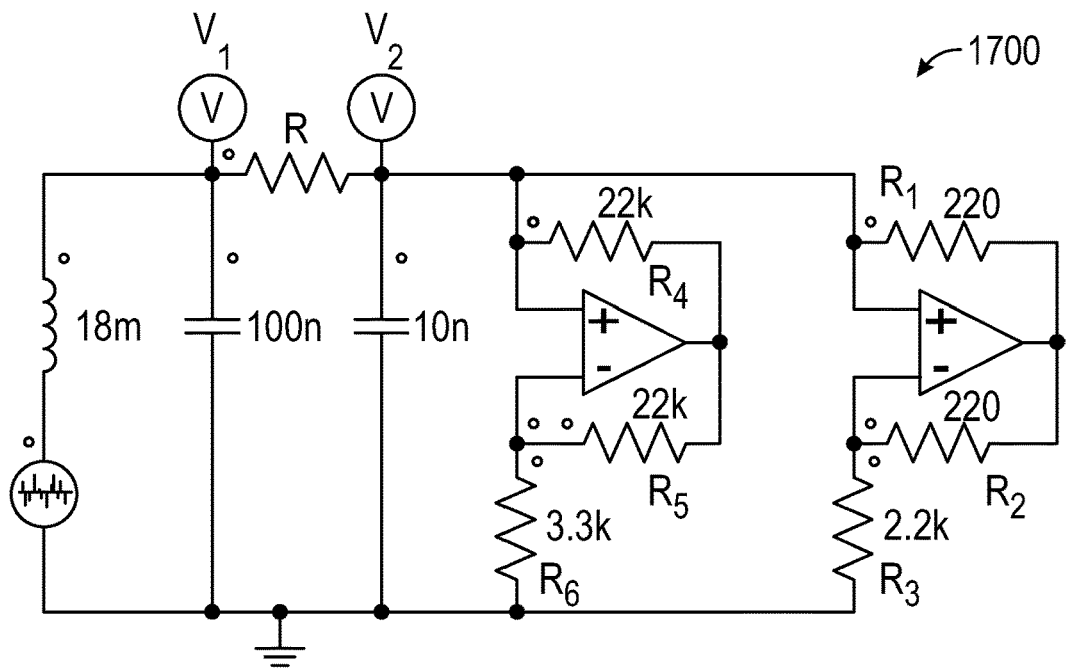
FIG. 17A is a circuit diagram of an ideal Chua circuit, according to one embodiment, used for simulating chaotic response, limit-cycle response, and validating experimental chaotic responses using PSIM™.

FIG. 17A is a circuit diagram of an ideal Chua circuit 1700 as implemented in a simulation platform, such as PSIM™, for illustrating a simulated chaotic response, limit-cycle response, and experimental chaotic responses, which may be utilized in a synchronization unit to implement or otherwise provide a non-linear characteristic or chaotic characteristic for the synchronization unit to enable self-synchronization capability. FIG. 17A illustrates a model of a circuit 1700 and FIGS. 17B-E illustrate how simulation of that circuit 1700 demonstrates chaotic circuit behavior. The circuit of FIG. 17A shows a design for demonstrating the anticipated double scroll chaotic response shown in FIG. 17B with R=1.7 kohms. The values of L, C1, C2 are: L=18mH; C1=10 nF; C2=100 nF. The non-linear resistor NR is realized with: R1=220 ohms, R2=220 ohms, R3=2.2 kohms, R4=22 kohms, R5=22 kohms, R6=3.3 kohms.

Figure 17B:
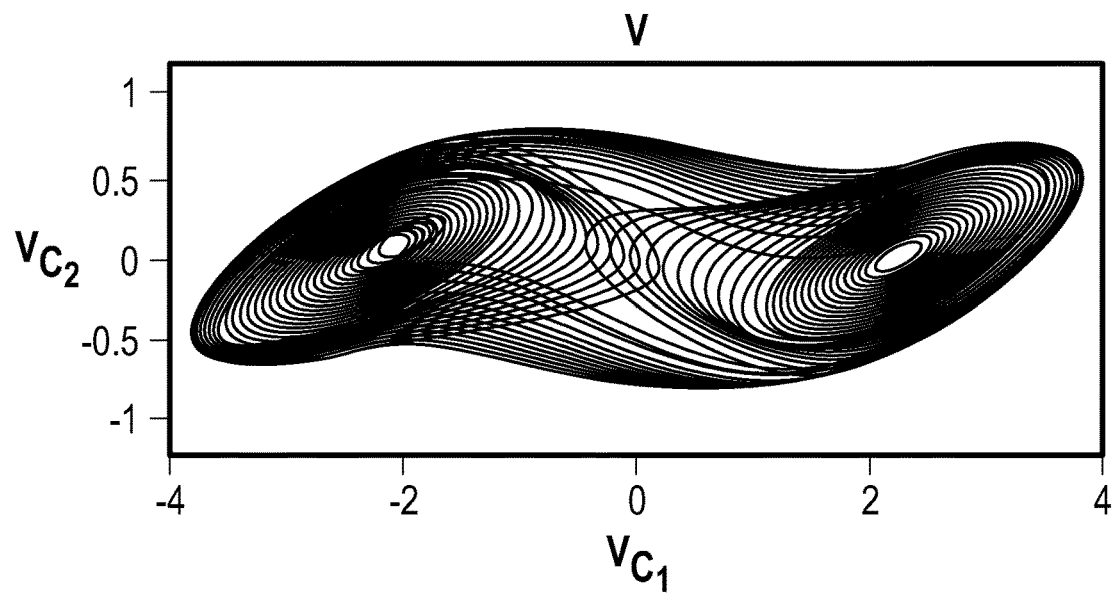
FIGS. 17B-E are graphs showing the response of the simulated ideal Chua circuit of 17A.
Figure 17C:
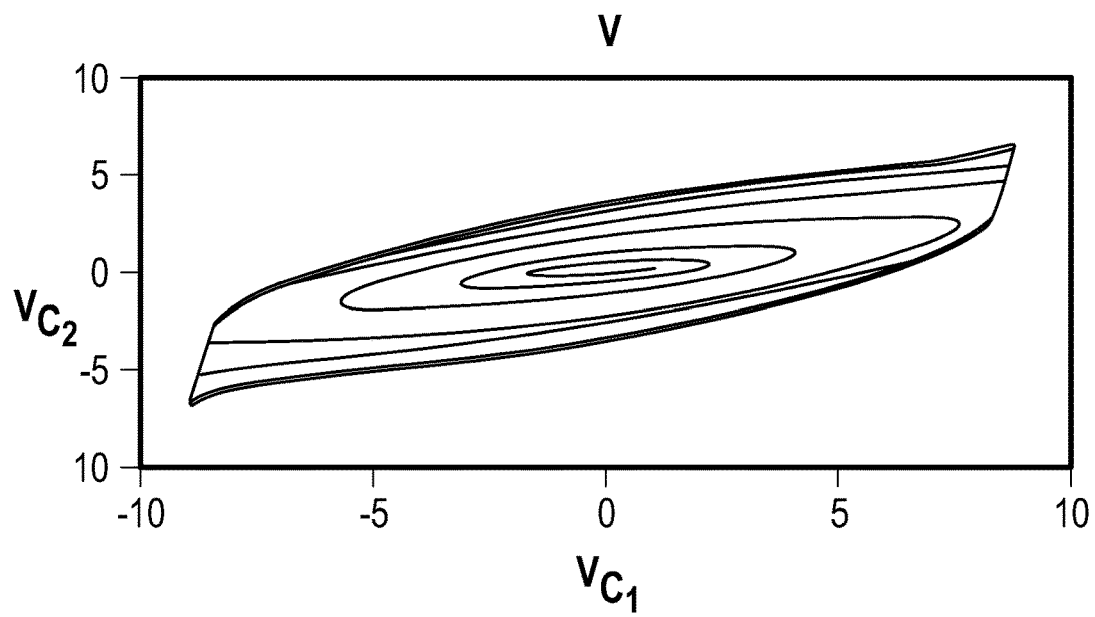
Figure 17D:
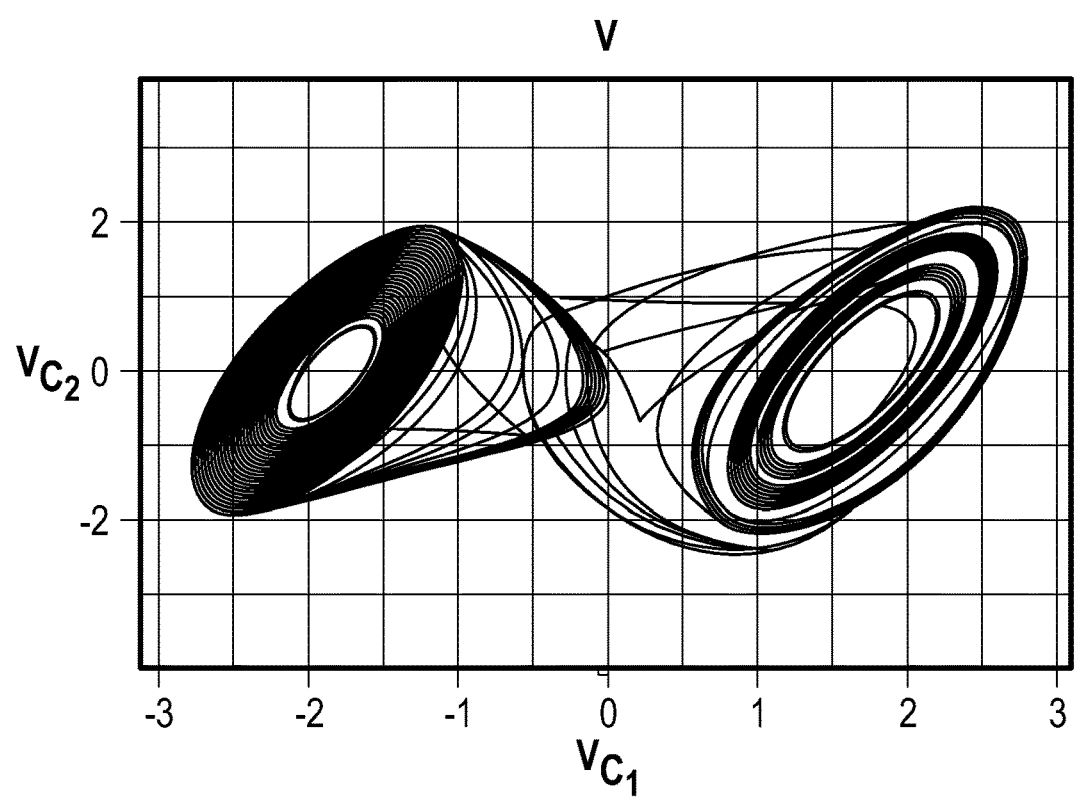

FIGS. 17B-E are graphs showing the response of the tested ideal Chua circuit 1700 of 17A. The stable limit-cycle operation is illustrated in FIG. 17C with R=1.37 kohms. The stable limit-cycle propagates outwards from the initial condition settling on the outmost path illustrated in FIG. 17C. The experimental chaotic operation is illustrated in FIG. 17D. The limit-cycle operation of FIG. 17D demonstrates a non-linear phenomenon.

Figure 18A:
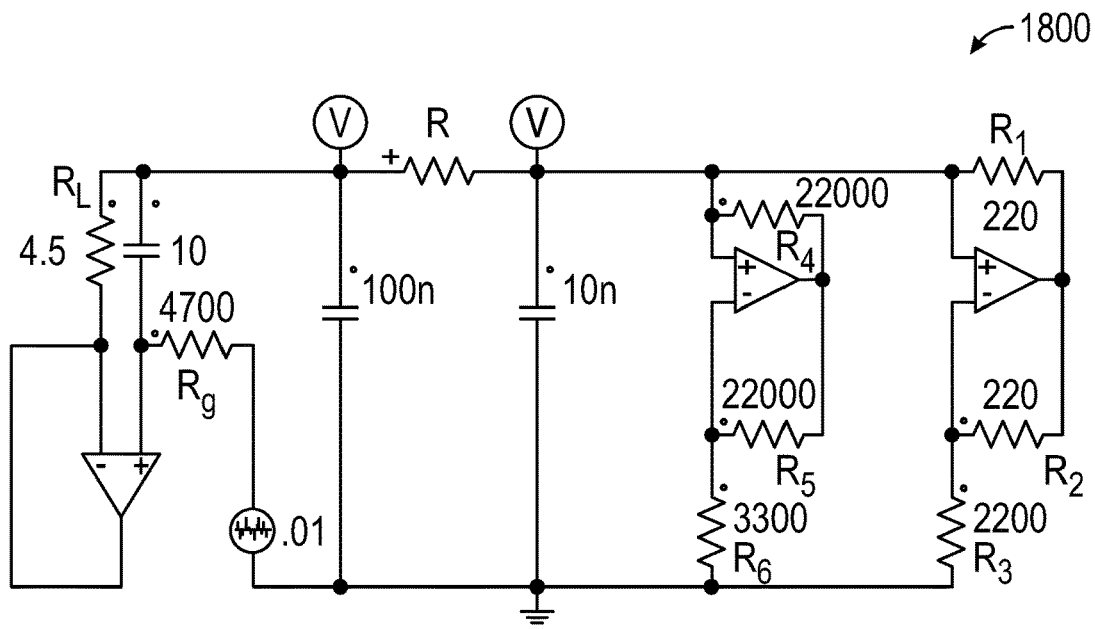
FIG. 18A is a circuit diagram of an inductor-less Chua circuit with emulated non-linear resistor and inductor, according to one embodiment.
Figure 18B:
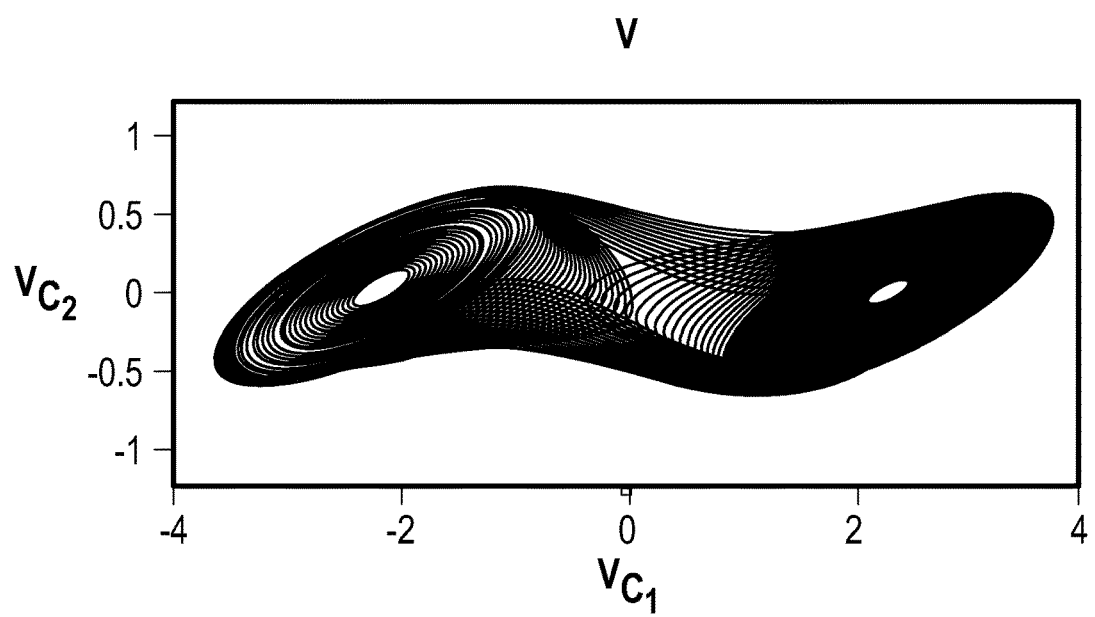
FIGS. 18B-E are graphs showing the response of the tested inductor-less Chua circuit of FIG. 18A.

FIG. 18A is a circuit diagram of an inductor-less Chua circuit 1800 as with emulated non-linear resistor and inductor. The inductor-less Chua circuit of FIG. 16 is the basis of the emulation in FIG. 18A, which may be utilized in a synchronization unit to implement or otherwise provide a non-linear characteristic or chaotic characteristic for the synchronization unit to enable self-synchronization capability. The double scroll chaos (R=1.7 kohms) and stable limit-cycle (R=1.37 kohms) responses, similar to the original Chua circuit, are shown in FIGS. 18B-E.

Figure 18C:
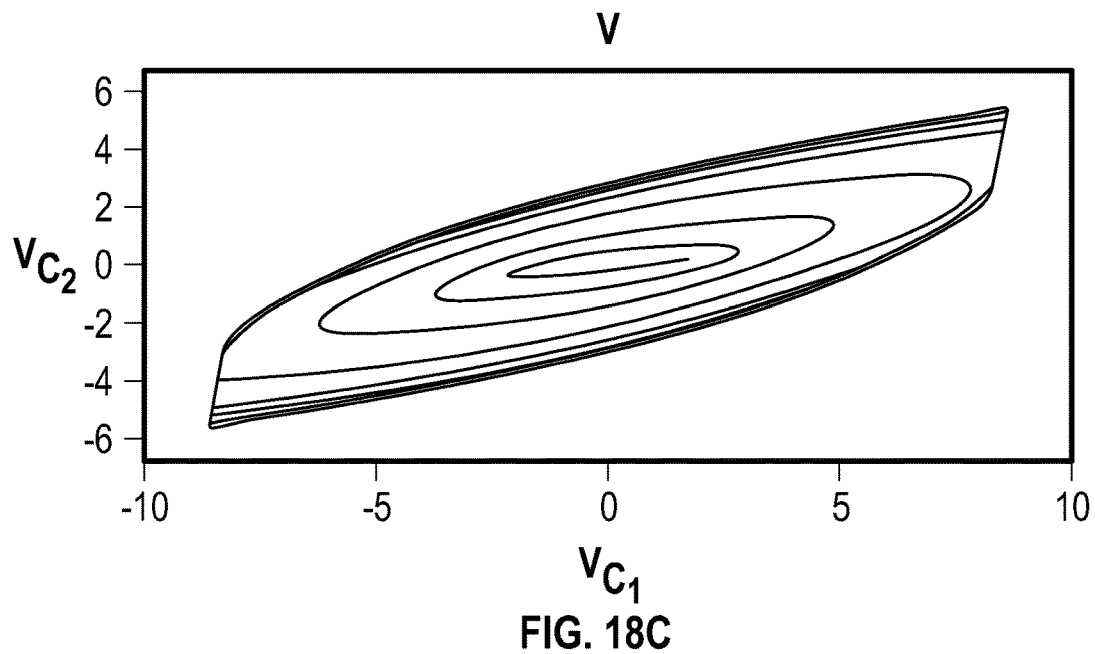
Figure 18D:
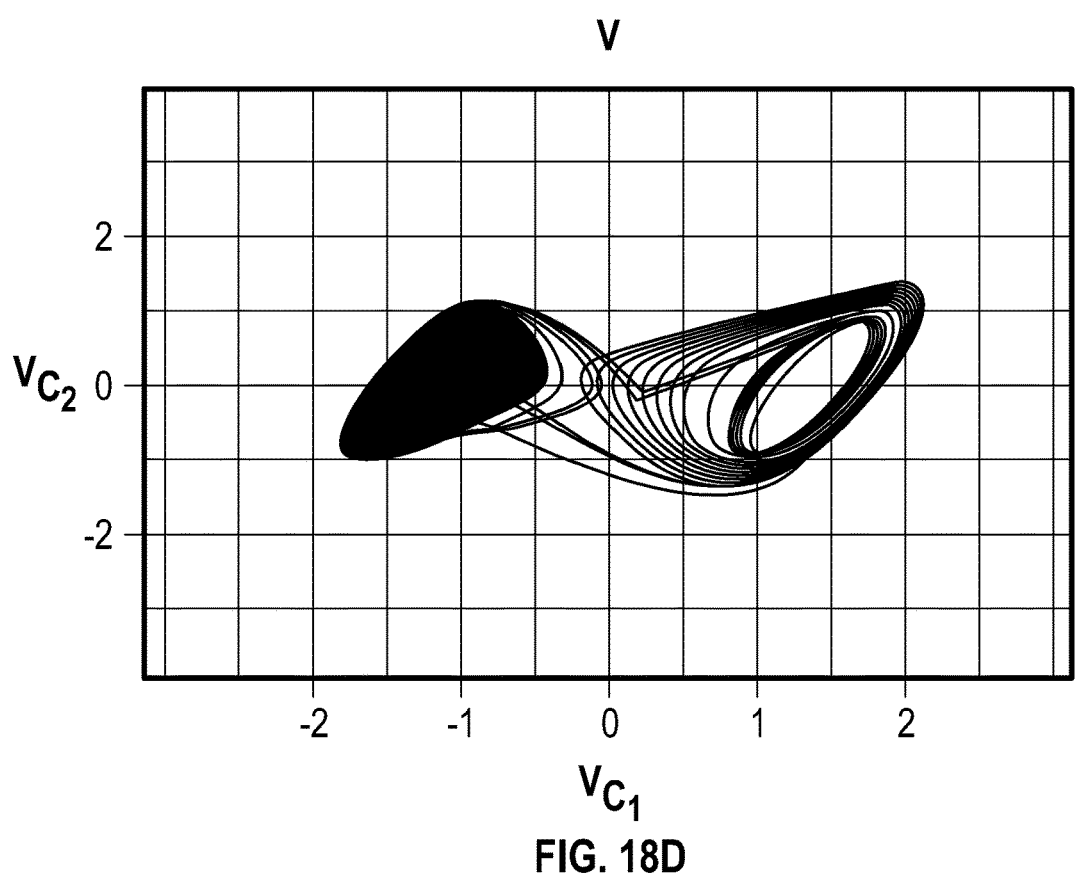
Figure 18E:
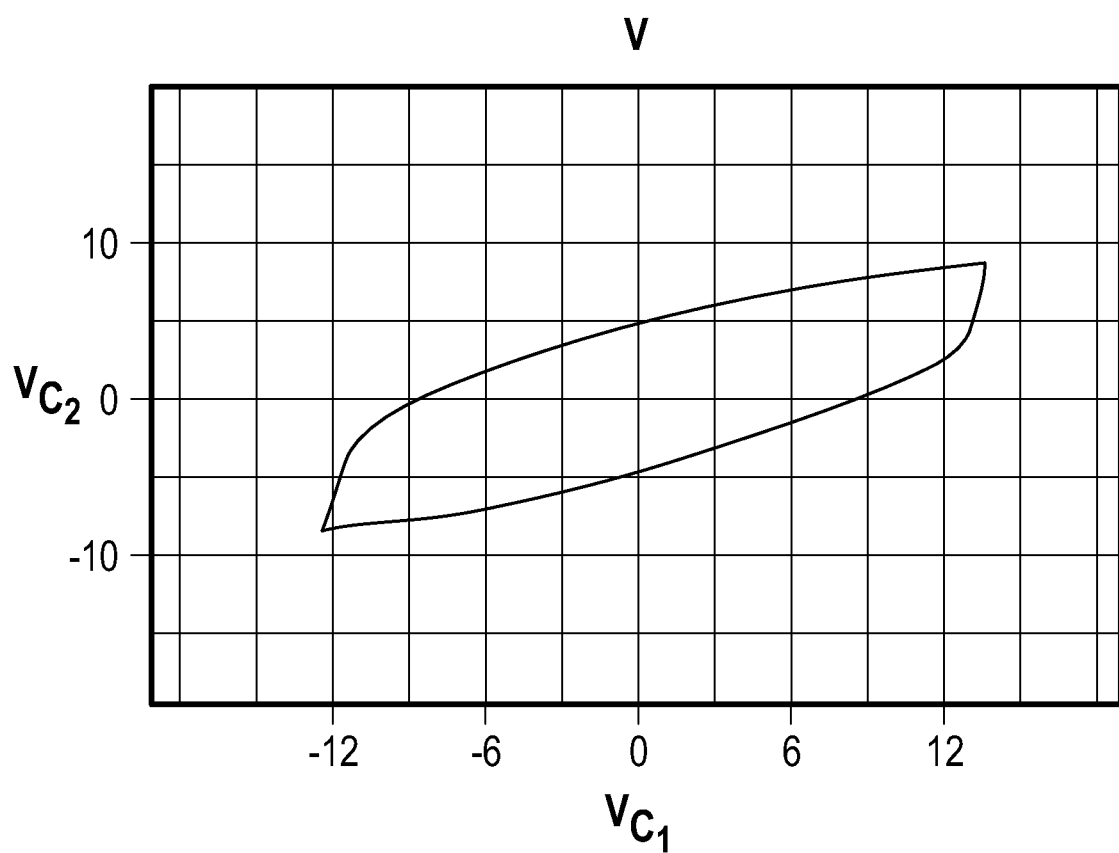

The graphs in FIGS. 18B-E illustrate the ability of the inductor-less Chua circuit 1800 of FIG. 18A to operate in chaotic and stable limit-cycle modes. A periodic limit-cycle state as illustrated in FIG. 18C, is used to provide a stable 60 Hz output as opposed to the double scroll attractor (chaotic state) of FIG. 18D, which would produce a chaotic output.

Figures 19, 20:
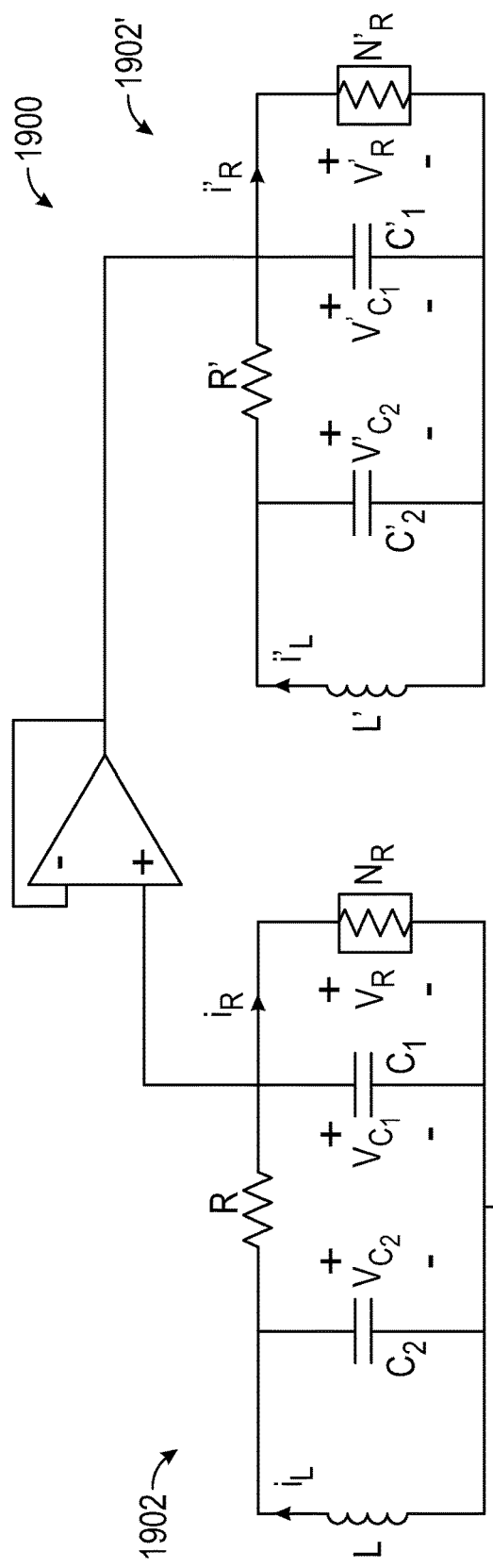
FIG. 19 is a circuit diagram of an x-drive configuration for synchronizing Chua circuits, according to one embodiment.
FIG. 20 is a circuit diagram of three x-driven self-synchronizing Chua circuits, according to one embodiment.

FIG. 19 is a circuit diagram of a Chua x-driven system 1900 with two Chua circuits 1902, 1902' arranged in an x-drive configuration. The x-drive configuration of FIG. 19 is designed to show that Chua circuits 1902, 1902' have the ability to self-synchronize in a number of different applications, such as coupled and driven systems. The system 1900 of FIG. 19 shows a circuit design that demonstrates the synchronization of the inductor-less Chua x-driven system. The x-driven system 1900 of FIG. 19 is a system with two Chua circuits 1902, 1902' synchronized via non-linear x-parameter. In system 1900, the non-linear x-parameter is the positive voltage node of C1 in the Chua circuit 1902. The x-parameter $C_1$ from the master circuit 1902 drives the x-parameter Cr of the second circuit 1902' using a voltage follower.

FIG. 20 is a circuit diagram of a Chua x-driven system 2000 with three Chua circuits 2002, 2002', 2002" arranged in an x-drive configuration. The system 2000 illustrated in FIG. 20 represents three x-driven self-synchronizing Chua circuits 2002, 2002', 2002". The synchronization of this embodiment in chaos and stable limit-cycle serves to demonstrate a design for an inverter implementation, according to embodiments of the present disclosure.

Figure 21A:
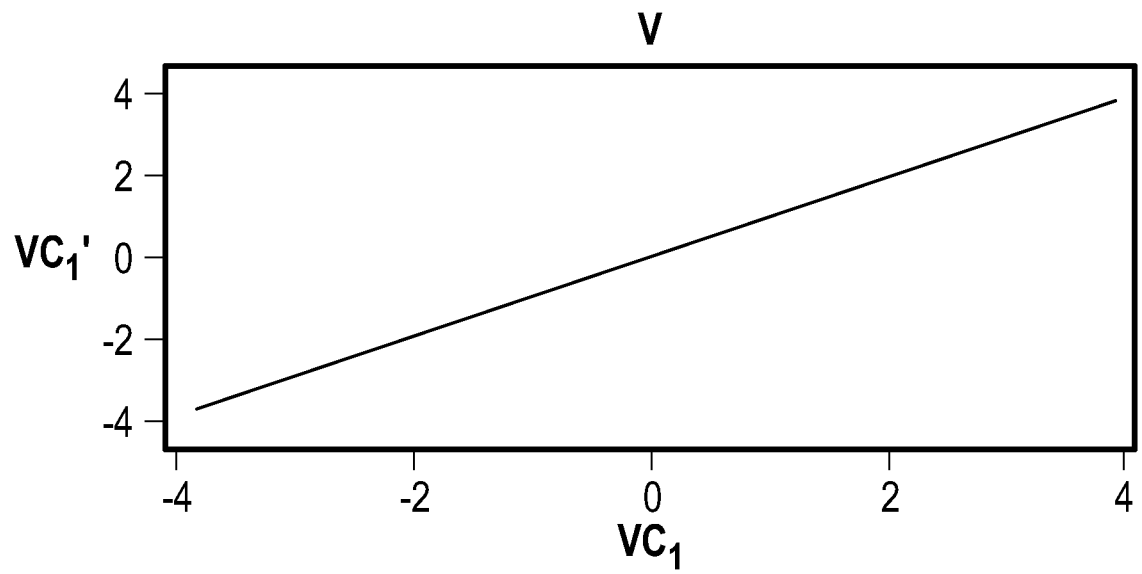
FIG. 21A-C are graphs showing the response of two inductor-less Chua circuits synchronized in (a) chaotic and (b) stable limit-cycle and experimentally synchronized in (c) stable limit-cycle.
Figure 21B:
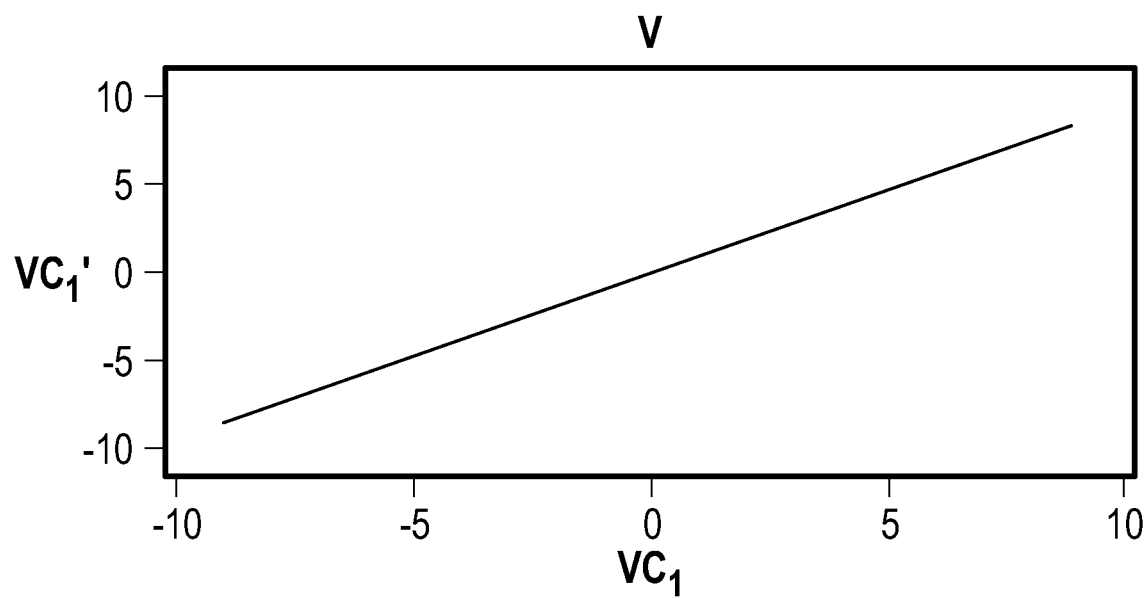
Figure 21C:
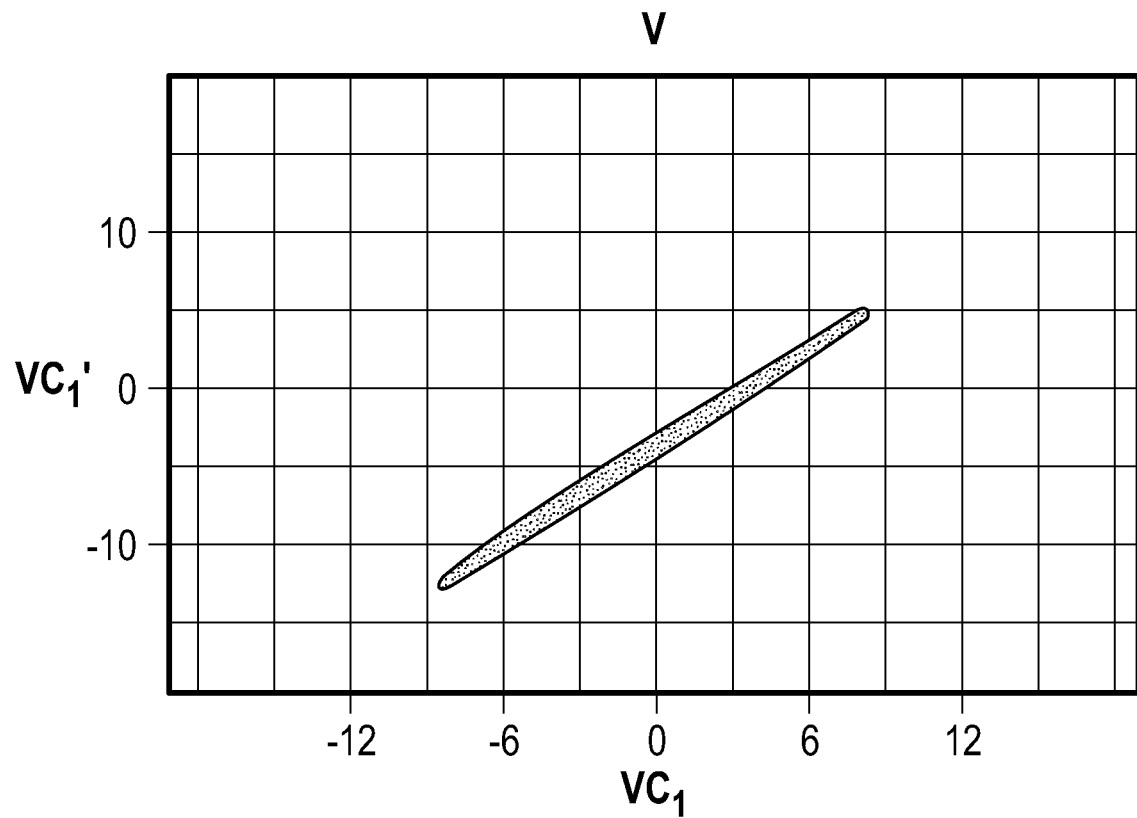

FIG. 21A-C are graphs showing the response of two inductor-less Chua circuits synchronized in (a) chaotic and (b) stable limit-cycle and (c) experimentally synchronized in stable limit-cycle. FIG. 21A is a graph illustrating the response of the first two Chua circuits 2000, 2002' in a simulation and that the simulated Chua circuits 2000, 2002' successfully synchronized with identical double scroll responses. Specifically, the voltage $V_{C1}$ of the capacitor $C_1$ is the same as the voltage $V_{C1'}$ of the capacitor $C_{1'}$, thereby showing synchronization. Though not shown, the synchronization result of the second Chua circuit 2000' and the third Chua circuit 2000" is identical.

The bifurcation parameter is adjusted using R to move the operational state of circuit 2000 from the double scroll to the periodic limit-cycle state. In the periodic state, the response of the simulated first two Chua circuits 2000, 2000' is as illustrated in FIG. 21B. The graph of FIG. 21B shows the first two circuits 2000, 2000' also synchronize in the periodic limit-cycle state. Specifically, the voltage $V_{C1}$ of the capacitor $C_1$ is the same as the voltage $V_{C1'}$ of the capacitor $C_{1'}$, thereby showing synchronization. Again, though not shown, synchronization result of the second Chua circuit 2000' and the third Chua circuit 2000" is identical. The simulation results were then verified experimentally. The synchronized response of two inductor-less Chua circuits in the periodic limit-cycle state is illustrated in FIG. 21C.

Figure 22:
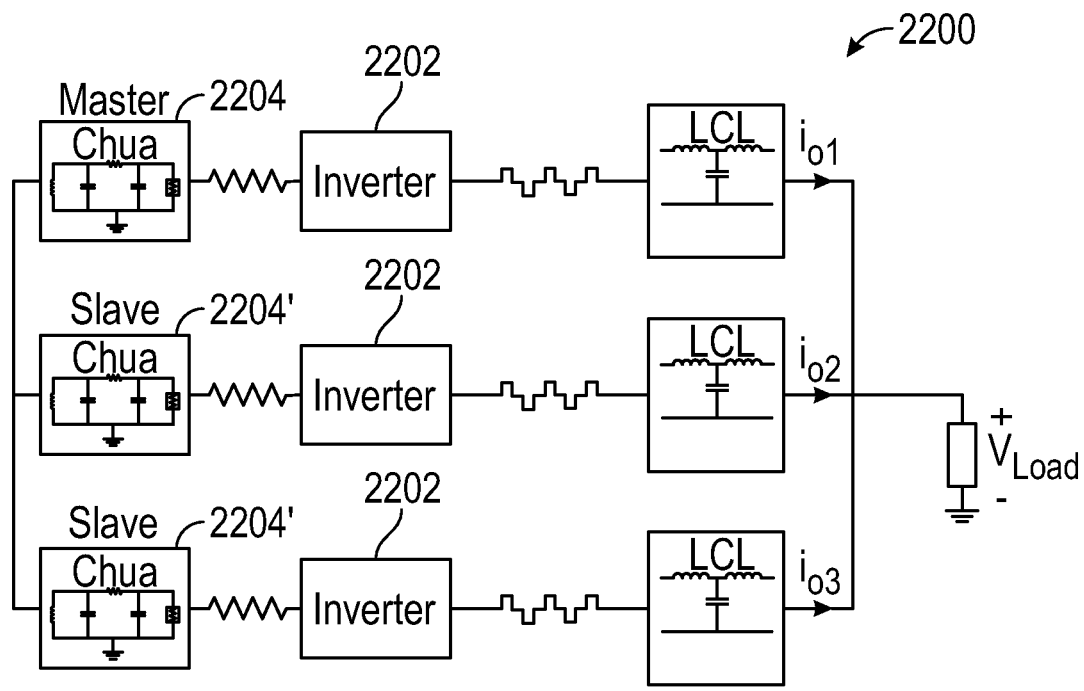
FIG. 22 is a system block diagram of a three inverter microgrid, according to one embodiment of the present disclosure.

FIG. 22 is a system block diagram of a three inverter microgrid 2200. In this embodiment, the inverters 2202 are connected in parallel and the output voltage of the inverters 2202 synchronize with each other. The output currents are identical, which shows proper load sharing. The inverters 2202 are driven using the synchronized reference voltage from Chua circuits 2204, 2204'. The inverters 2202 can synchronize in two to three cycles. In this example, the inverters run at 120 VAC.

The self-synchronizing driver (e.g., synchronization unit), as previously described, can be arranged in a variety of ways. The purpose of including further examples is to illustrate and support further disclosure of this type of system, although the exact arrangement of the example provided is not indicative of the only arrangement a self-synchronizing driver may embody.

Fundamentally, the disclosed embodiments relate to the use, application, and integration of an autonomous circuit to a control system in order to synchronize any number or combination of AC signals to each other or a designated reference such as the grid. An autonomous circuit contains the following components in order to exhibit chaotic behavior: non-linear elements, locally active resistors and energy storage components. These are the basic building blocks to create a non-linear chaotic system. When building or manufacturing such a system, it can be achieved through a variety of designs and physical components.

Non-linear chaotic circuits are well-established and documented, and examples of the non-linear chaotic circuits include but are not limited to a Chua circuit, a Van der Pol oscillator, a Rössler attractor, a Lorentz oscillator, a Colpitts oscillator, a neon bulb oscillator, a Rayleigh oscillator, a Nishio circuit, a negative resistance oscillator, and a Chaotic oscillator or any class of negative resistance oscillators, non-linear resistors, and non-linear oscillator. Any such system can be used in the application detailed by this invention to synchronize AC signals.

The above-described non-linear systems exhibit a variety of chaotic behaviors including, periodic, single-scroll, double-scroll and limit-cycle behavior. All these chaotic regimes can be utilized in the self-sync driver to synchronize AC signals. Additionally, the electrical components' values can be adjusted to seek or tune to certain desired behaviors. More detail is provided in the implementation section below.

A self-synchronizing driver consisting of a combination of the hereto-mentioned components must be implemented into an electrical control system to provide the sought-after output of synchronous AC signals. Electrical control systems include but are not limited to, inverters, synchronizers, generator control systems and microgrid control systems. These types of systems currently follow some form of the industry standard by utilizing software controls to measure, adjust and synchronize the AC signals of various generation sources. These systems could all utilize the self-synchronizing driver as a replacement for the existing control systems by using the output of the driver system as the reference to synchronize the signals from each source. This can be done by referencing any combination or derivative information about the voltage or current output from the circuit.

This driver may be built by two primary methods, building a circuit out of standard electrical components, or transistor level design. The standard electrical components used to build such a driver include but are not limited to capacitors, resistors, inductors, diodes, and transistor-based components. Additionally, the process of further "black-boxing" of this system can result in implementations that are more deeply embedded such as transistor-level circuitry through processes such as metallization or other industry standard forms of embedding electrical systems.

There are a variety of methods to implement the driver into control systems. It can be done as a standalone circuit or chip integrated into existing controller designs by affixing it by connection points which read the output of the circuitry frequency and phase. This can be achieved by any variety of methods of affixing via adhesives, pinholes or other standard methods of component assembly. The driver's circuit design may also be integrated into the printed circuit board (PCB) of the control system, embedded among all the other functionality the PCB offers. This is a common method used to obfuscate the technology and increase protection against reverse engineering without incurring the costs of metallization through transistor-level design. The driver circuit design may also be integrated with the use of transistors into a chip, which can then be integrated into the PCB.

Standard methods of manufacturing control systems will be utilized to implement the self-synchronizing driver. Depending on how the systems are built, by one of the three methods described in the paragraph above, there may be a preferred or more cost-effective method for manufacturing the control system with the self-sync driver applied to it. The manufacturing of the self-sync driver may be a multi-step process using any of the hereafter-mentioned methods due to some components being more effectively integrated with certain methods.

Any small or sensitive components of the system such as resistors, diodes, transistors, or integrated circuit can be integrated by surface-mount device (SMD) and/or surface mount technology (SMT) and/or assembly thereof. This is usually done by automated processes controlled by robots or other manufacturing equipment. This begins with some standard form of adhesive such as binding paste, liquid or other material being applied to the boards. This is followed by the automatic placement of the components onto the PCB. The components are then affixed by the corresponding method of adhesive through heating, cooling, or exposure to chemicals to bind the components to the board.

Larger components of the system, such as capacitors will be implemented by THT or through hole technology. This manufacturing method is to ensure that larger components are placed onto the board accurately and carefully. This process is usually done by human hand although in some cases may also be automated through standard manufacturing equipment. Regardless of the method, it involves the placement and, in some cases, soldering of the components on the board. Soldering can also be completed in a later step of the manufacturing process. Both these methods are standard practice for integrating electrical components into a functioning system. Once the components are placed, they are tested to verify proper functionality and typically sealed or coated for additional protection. Any order of the detailed manufacturing methods can be used to integrate the self-synchronizing driver into circuit design. This applies to any control system to achieve the desired outcome of synchronizing AC signals.

The following description proposes one embodiment of a DC/AC inverter synchronization method based on inductor-less Chua circuits that are capable of operating at 50-60 Hz. No known Chua circuits have been shown to function at these frequencies because of the internal resistance of the inductor. By replacing the inductor with an op-amp gyrator, the Chua circuit can operate in the 50-60 Hz frequency range. Simulations and experiments show that the inductor-less Chua circuit is capable of chaotic and limit-cycle behavior. Moreover, simulations and experiments show that multiple inductor-less Chua circuits were synchronized in chaotic and limit-cycle modes. The limit-cycle behavior of the inductor-less Chua is then used to synchronize the voltage and frequency of inverters in an inverter-based microgrid. Simulation and experimental results show the proper operation of a 60 Hz inverter-based microgrid. This inverter synchronization method has the following advantages: (1) each Chua circuit can cost approximately $2, (2) does not require microprocessors or any programming knowledge, (3) no frequency-locked loops (FLL) or phase-locked loops (PLL) are needed and (4) uses the inherent synchronization feature of the non-linear Chua circuits which eliminates the need of tuning filters and loops. This synchronization approach of inverter-based microgrids has the potential of dramatically reducing the overall cost of a microgrid and increasing universal access to affordable electricity.

NOMENCLATURE $v_{C1}$; $v_{C2}$ Voltages across the capacitors C1 and C2.
$i_L$ Current through the inductor L.
$N_R$ The Chua Diode, a non-linear resistor.
$G_{-a}$, $G_a$, $G_b$ The slopes in each region in FIG. 12.
$B_{p1}$, $B_{p2}$ The breakpoints splitting up the piecewise linear regions in FIG. 12.
$E_{Sat}$ The positive saturation voltage of the op-amps in the emulated NR.
$\beta$ The bifurcation parameter of the Chua circuit.
$R_{Lint}$ The internal series resistance of the inductor L.
Y Represents the maximum value of $R_{Lint}$ that allows the circuit to operate chaotically
m, m0; m1, m-1 The slope of NR depending on which region the nonlinear resistor is being analyzed in.

I. Introduction

Recent studies have shown that islanded or off-grid inverter-based microgrids are evolving into the most cost-effective solution for bringing electric power to unelectrified rural communities. Inverter-based microgrids have been extensively studied in the literature. Synchronization of the voltage, frequency, and phase angle of the inverters in a microgrid is fundamental to maintaining stability. Synchronization would lead to proper operation and load sharing capability of the inverters. Previous approaches have relied on master-slave or decentralized control systems with some level of microprocessor intelligence to control the system's voltage and frequency. Oscillator-based synchronization techniques are known. However, synchronizing oscillators that do not have an inherent capability to synchronize are nontrivial and complex. In certain analysis, harmonic oscillators developed were theoretical and only simulation results were reported. In other evaluations, virtual oscillators were used to control an inverter. However, the results did not include experimental results.

A new, simple, and cost-effective method for synchronizing inverter-based DERs in a microgrid based on the non-linear phenomena of the Chua circuit will now be presented. Chua demonstrated that a relatively simple electric circuit, called Chua circuit, could produce true chaotic behavior. The Chua circuit, illustrated in FIG. 11, is made up of capacitors, resistors, inductors and the non-linear Chua diode NR. One of the subsequent outcomes of this discovery was the demonstration of self-synchronizing chaotic systems. Numerous applications of this phenomena were explored such as secure communications and trajectory recognition. Several studies have improved upon and proposed emulating the inductor using Wien-bridge oscillators, gyrators, operational transconductance amplifier, or current feedback op amps. These studies have focused on the following applications: high frequency from several kHz to MHz, double-scroll or single-scroll chaotic behavior. No other known studies have successfully demonstrated chaotic, and limit-cycle behavior for frequencies below 1 kHz. At those frequencies, the internal resistance of the inductor is the main inhibitor of proper operation. Specifically, the stable limit-cycle behavior in the 0-1000 Hz range has been largely ignored. In addition, previous studies have not shown the self-synchronization ability of inductor-less Chua circuits in chaotic or limit-cycle modes in the 0-1000 Hz range.

This embodiment provides a Chua circuit that is capable of chaotic and limit-cycle behavior in the 0-1000 Hz frequency range. This will open up additional applications for the Chua circuit especially in electric power systems which run typically at 50-60 Hz. Islanded or off-grid inverter-based microgrids are such an application that the following will show to be especially suited for Chua circuit-based control systems.

The disclosed inverter synchronization approach is fundamentally different from previous approaches since the Chua circuits drive the pulse width modulation (PWM) circuitry that control the power electronic switches of the inverter. Thus, the synchronization is at the PWM drive circuitry level and not reliant on PLL or other synchronization strategies.

The proposed Chua circuit is made up of three Operational Amplifiers (Op-Amps), nine resistors and three capacitors. Thus, this solution is relatively simple and at a very low cost. Mathematical, simulation and experimental results show that inverter synchronization is possible using Chua circuits. Using three synchronized Chua circuits to control the operation of three separate inverters, this approach can intrinsically stabilize a microgrid while mitigating the need for complex and expensive control systems. Synchronizing inverters by taking advantage of the intrinsic feature of self-synchronization of Chua circuits greatly simplifies the process. This will enable easier and more efficient implementation of inverter-based microgrids.

To ensure that the results of this study are replicable by the power community, the inductor-less Chua circuit is presented thoroughly followed by the inverter-based microgrid results.

The description that follows includes: an implementation of an inductor-less Chua circuit using only three Op-Amps, nine resistors and three capacitors; demonstration, via simulations and experiments, of the chaotic and limit-cycle behavior of the inductor-less Chua circuit; synchronization of multiple Chua circuits in chaotic and limit-cycle operation, and simulated and experimental synchronization of three DC/AC inverters forming an islanded microgrid using inductor-less Chua circuits.

Section II below covers the mathematical, simulation and experimental validation of an inductor-less Chua circuit. Section III below presents the chaotic and limit-cycle synchronization of multiple Chua circuits. Section IV covers the simulation and experimental results of the chaotic and limit-cycle synchronization of three inverters.

II. The Inductor-Less Chua Circuit

This section presents the mathematical, simulated and experimental implementation of an inductor-less Chua circuit with emulated inductor and non-linear resistor that is capable of operating in chaotic and limit-cycle modes between 0-1000 Hz.

A. Mathematical Formulation

1) Chua Circuit: The basic Chua circuit is illustrated in FIG. 11. As previously described, FIG. 11 is a diagram of an Ideal Chua Circuit 1100, which may be utilized to implement or otherwise provide a non-linear characteristic or chaotic characteristic to enable self-synchronization capability. The inductor L is a linear inductor, the resistor R is a linear resistor, the capacitors $C_1$ and $C_2$ are linear capacitors, and $N_R$ is a nonlinear resistor called the "Chua diode." The modified state equations for this circuit with G=1/R are expressed as (1):

$$C_1 \frac{dv_{C_1}}{dt} = G(v_{C_2} - v_{C_1}) - g(v_{C_1})$$

$$C_2 \frac{dv_{C_2}}{dt} = G(v_{C_1} - v_{C_2}) + i_L$$

$$L \frac{di_L}{dt} = -v_{C_2}$$

g(vC1) introduces a simple piecewise non-linear resistor $N_R$ which ultimately leads to chaotic behavior. The non-linear resistor in FIG. 11 has the I-V characteristics illustrated in FIG. 12. As previously explained FIG. 12 is a graph 1200 illustrating current (I) and voltage (V) characteristics of a Chua diode or non-linear resistor $N_R$. The graph 1200 also indicates regions of the limit-cycle behavior with a designation of the slope $G_{-a}$. The slopes in each region are defined as G-a, Ga, and Gb. The breakpoints splitting up the piecewise linear regions are denoted by Bp1 and Bp2. ESat is the positive saturation voltage of the op-amps in the emulated NR. g(vC1) is defined as (2):

$$g(v_{C_1}) = G_b v_{C_1} + \tfrac{1}{2}(G_a - G_b)[|v_{C_1} + B_{p_2}| - |v_{C_1} - B_{p_2}|]$$

The slopes in each region in FIG. 12 are defined as G-a, Ga, and Gb. The breakpoints splitting up the piecewise linear regions are denoted by Bp1 and Bp2.

2) Parameterization: It is convenient to write the state equations (1)-(2) in a dimensionless form by letting (3):

$$x = v_{C_1}/B_{p_2} \quad m_0 = G_b/G \quad \tau = tG/C_2$$
$$y = v_{C_2}/B_{p_2} \quad m_1 = G_a/G \quad \alpha = C_2/C_1$$
$$z = i_L/GB_{p_2} \quad m_{-1} = G_{-a}/G \quad \beta = C_2/LG^2$$

Thus, the system of equations (1)-(2) becomes (4):

$$\frac{dx}{d\tau} = \dot{x} = \alpha(y - x - f(x))$$

$$\frac{dy}{d\tau} = \dot{y} = x - y + z$$

$$\frac{dz}{d\tau} = \dot{z} = -\beta y$$

where (5):

$$f(x) = m_0 x + \frac{1}{2}(m_1 - m_0)[|x+1| - |x-1|]$$

and β defines the bifurcation parameter after normalization.

3) Non-linear Resistor: Many topologies have been proposed for realizing the non-linear resistor of the Chua circuit. For this embodiment, the Op-Amp topology described and illustrated in FIG. 13 is used. The breakpoints of FIG. 12 serve as the transition point between piecewise linear states. The slopes and the breakpoints are related to R1-R6 of 3 according to (6), (7), and (8):

$$B_{P_1} = \frac{R_3}{R_2 + R_3} E_{sat}, \quad B_{P_2} = \frac{R_6}{R_5 + R_6} E_{sat}$$

-continued $$R_1 = R_2, \quad R_3 = \frac{E_{Sat}}{(B_{P_2} - E_{Sat})G_b - B_{P_2}G_a}$$

$$R_4 = R_5, \quad R_6 = \frac{E_{Sat}}{(E_{Sat} - B_{P_2})(G_b - G_a)}$$

where $E_{Sat}$ is the positive saturation voltage of the op-amps in the emulated $N_R$.

The outer regions with positive slope G-a are where the desired periodic limit-cycle response occurs for inverter synchronization. The saturation of the op-amps set the maximum of the limit-cycle region while the breakpoints control the inner bounds. For inverter application, the breakpoints are adjusted to increase the operating range of the limit-cycle region by maximizing the difference between ESat and BP1 while still containing a miniscule central non-linear chaotic region. The mode of operation (chaos, double-scroll chaos or limit cycle) of the Chua circuit can be adjusted using the bifurcation parameter $$\beta = C_2 \frac{R_2}{L}$$

where R is the most easily adjustable component to change the value of beta $\beta$.

As $\beta$ varies, the Chua circuit transitions from chaos to a stable limit-cycle. Similarly, the inductor-less Chua circuit transitions can be achieved by varying R in $\beta$. The stable limit-cycle is a periodic state which is ideal for synchronizing inverters. By design, the final version of the inductor-less Chua circuit will operate in the limit-cycle region with a frequency of 60 Hz. This is crucial for a microgrid's operation since a chaotic output is highly undesirable.

4) Effect of the Inductor's internal series resistance $R_{Lint}$. On Performance for Frequencies below 1 kHz: When designing the ideal Chua circuit (FIG. 11) with a physical inductor, the internal series resistance $R_{Lint}$ of the inductor L needs to be taken into account. $R_{Lint}$ has a dramatic effect on the operation of the Chua circuit and the ability of the circuit to operate at lower frequencies. An example is given below of the effect of $R_{Lint}$ at 60 Hz.

Equations (1) and (4), adjusted to account for $R_{Lint}$ are (9) and (10):

$$L\frac{di_L}{dt} = -(v_{C_2} + R_{Lint}i_L)$$

$$\frac{dz}{d\tau} = \dot{z} = -\beta y - \gamma z$$

where $$\gamma = \frac{RR_0C_2}{L}$$

$R_0$ represents the maximum value of $R_{Lint}$ that allows the circuit to operate chaotically. As illustrated in FIGS. 14A-14D, a change of 0.1 ohms in $R_{Lint}$ causes a transition from limit-cycle ($R_{Lint}$=0.2 ohms) to double scroll chaos ($R_{Lint}$=0.3 ohms) behavior. A 0.1 ohm change causes different behavior. FIGS. 14A-D also illustrate how the behavior changes from double-scroll chaos to chaos when the $R_{Lint}$ changes from 0.7 ohms to 0.8 ohms. Even a small change of 0.1 ohms in the internal resistance of the inductor can cause dramatic shifts in the performance of the Chua circuit. Thus, it is important to note the effects of the internal series resistance $R_{Lint}$ as a driving factor for the design choice of Chua circuits below 1 kHz. Due to the cost, size, and typical internal series resistance of commercially available inductors needed for 50-60 Hz operation of the Chua circuit, as well as the advantage of adjusting inductance for frequency scaling, a gyrator that emulates the inductor L was chosen for this work. The gyrator offers degrees of freedom for adjusting the frequency and series resistance in a simple op-amp configuration. The gyrator is critical for practical operation below 1 kHz. A gyrator consisting of a single op-amp, two resistors, and a capacitor can act as an inductor with inductance, L.

The particular gyrator implementation illustrated in FIG. 15 is ground-referenced, which works well in the Chua circuit as the inductor is also ground-referenced. The equivalent inductance of this op-amp circuit is derived from the state variables of the gyrator to give the approximation as follows (11):

$$v_L = R_gR_LC\frac{di_L}{dt} \quad L = R_gR_LC$$

5) Inductor-less Chua Circuit: The inductor-less Chua circuit used in this work and realized with op-amps is illustrated in FIG. 16. This particular implementation can be constructed using only three op-amps along with three capacitors and nine resistors, which is an improvement on previously reported inductor-less Chua circuits. The op-amp implementation of the Chua circuit allows for a very wide range of selectable operating frequencies and is able to operate in chaotic and limit-cycle modes.

6) Stability: The stability of the Chua circuit in the limit-cycle state has been analyzed previously. In the limit-cycle state, the outer op-amp saturation regions illustrated in FIG. 12 are considered.

To realize stability, the dimensionless state equations are manipulated into a third-order differential equation in terms of z as follows (12):

$$z^{(3)}+(1+\alpha+\alpha m)\ddot{z}+(\alpha m+\beta)\dot{z}+\alpha\beta(1+m)z+\alpha\beta(1+m)d=0$$

The parameters are congruent to those found in Section II-A2. The third-order differential equation above leads to the following characteristic equation using the Laplace transform. In the general case, the slope m of $N_R$ is equal to $m_0$, $m_1$, or $m_{-1}$ depending on which region the non-linear resistor is being analyzed. $m=m_{-1}$ occurs in the limit-cycle region. The equation is as follows (13):

$$s^3+(1+\alpha+\alpha m_{-1})s^2+(\alpha m_{-1}+\beta)s+\alpha\beta(1+m_{-1})=0$$

With eigen values $\gamma$, $\sigma+j\omega$, and $\sigma-J\omega$ the general solution to a third-order differential equation is (14):

$$s^3+(-2\sigma-\gamma)s^2+(\sigma^2+2\sigma\gamma+\omega^2)s+(-\sigma^2\gamma-\omega^2\gamma)=0$$

To relate the eigenvalues and system parameter, the two equations above are equated leading to the following set of equations (15), (16), and (17):

$$1+\alpha+\alpha m_{-1}=-2\sigma-\gamma\alpha m_{-1}+\beta=\sigma^2+2\sigma\gamma+\omega^2\alpha\beta(1+m_{-1})=-\sigma^2\gamma-\omega^2\gamma$$

For the Chua circuit to be stable, the real component of the eigenvalues must be negative.

$$\alpha=10, \beta=10.65$$

and m−1=6.2266 based on the values derived in Section II-C. Solving the system of equations leads to the eigenvalues of −72.41 and −0.43+ or −3.23. Thus, the system in the limit-cycle region is stable.

B. Simulation Verification

Ideal Chua Circuit in PSIM™ (PSIM hereafter): To verify PSIM's capability of simulating chaotic and non-linear behavior, the ideal Chua circuit of FIG. 11 is simulated as shown in FIG. 17b.

The values of L, C1, C2, and R are: L=18 mH, C1=10 nF, C2=100 nF, R=18.8 kohms. The non-linear resistor $N_R$ is realized with: R1=220 ohms, R2=220 ohms, R3=2.2 kohms, R4=22 kohms, R5=22 kohms, R6=3.3 kohms.

Figure 17E:
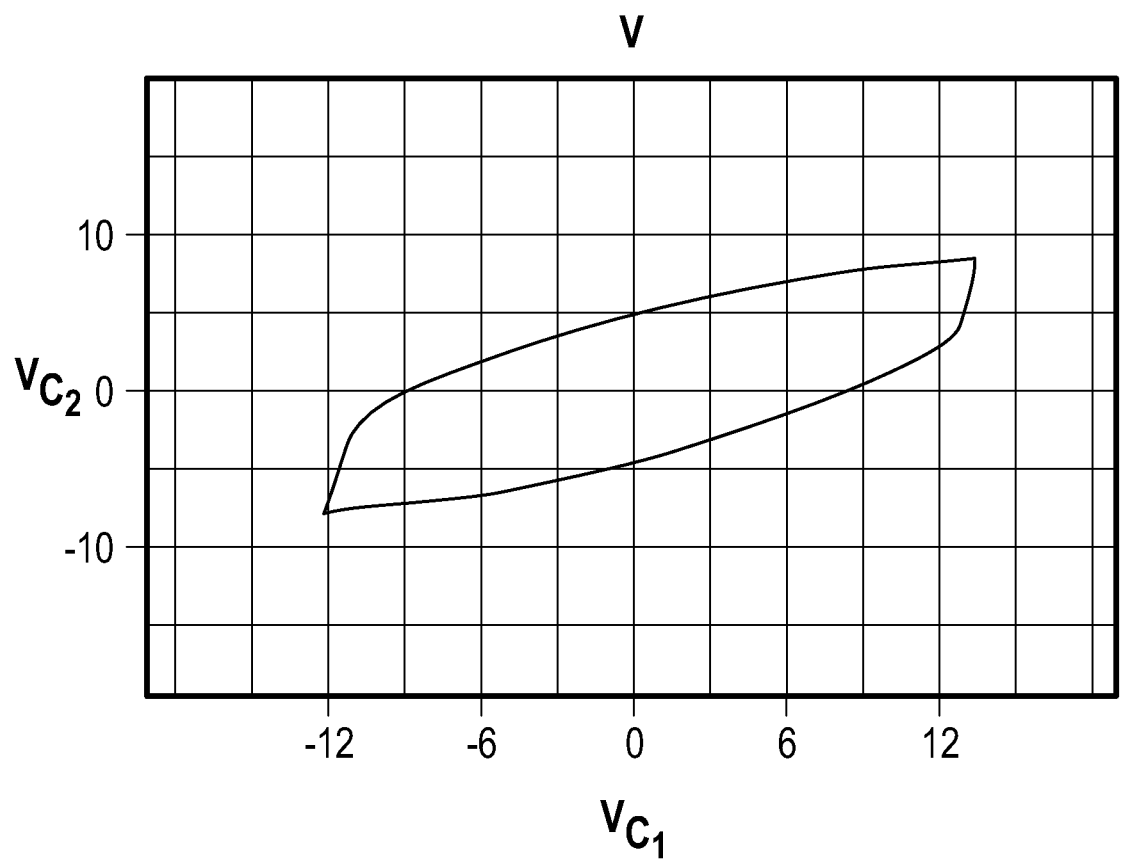

PSIM simulation software showed the anticipated double scroll chaotic response as illustrated in FIG. 17A with R=1.7 kohms, while the stable limit-cycle operation is illustrated in FIG. 17C with R=1.37 kohms. FIGS. 17A-E demonstrate that the PSIM simulation environment is able to model and predict chaotic circuit behavior. The stable limit-cycle propagates outwards from the initial condition settling on the outmost path illustrated in FIG. 17C. To verify the results from PSIM simulation, the circuit was experimentally built. The chaotic operation is illustrated in FIG. 17D while the limit cycle operation is illustrated in FIG. 17E. Experimental data verifies PSIM capability of accurately simulating non-linear phenomena.

Inductor-less Chua Circuit in PSIM: The inductor-less Chua circuit illustrated in FIG. 16 is simulated in PSIM as illustrated FIG. 18A. The double-scroll chaos (R=1.7 kohms) and stable limit-cycle (R=1.37 kohms) responses, similar to the original Chua circuit, are expected. The simulation results in FIGS. 18A-E illustrate the ability of the inductor-less Chua circuit to operate in chaotic and stable limit-cycle modes.

C. Experimental Validation

1) Scaled System: For use with a DC/AC inverter in an electrical power system, the circuit is scaled to operate at 60 Hz. The limit-cycle behavior is desired for inverter synchronization thus the stable limit-cycle operating range, between BP1 and BP2 in FIG. 12 is maximized. A periodic limit-cycle state as illustrated in FIG. 18C, is used to provide a stable 60 Hz output as opposed to the double-scroll attractor (chaotic state) of FIG. 18D, which would produce a chaotic output. To scale the inductor-less Chua circuit for 60 Hz operation, the resulting normalization constants are:

$$\alpha=10, \beta=18, \gamma=0.136, m_1=-1.3655, m_0=-0.738$$

III. Chaotic and Limit-Cycle Synchronization of Inductor-Less Chua Circuits

Chua circuits can self-synchronize in multiple different implementations such as coupled and driven systems. The inductor-less Chua circuit configuration used in this work has not been previously shown to synchronize. This section will show the synchronization of the inductor-less Chua x-driven system. An x-driven system is a system with two Chua circuits synchronized via the non-linear x-parameter, the positive voltage node of C1 in the Chua circuit illustrated in FIG. 19. The x-parameter in from the master circuit drives the x-parameter of the second circuit using a voltage follower.

This ensures that the voltage of the x-parameter in each circuit is equal. In an x-driven system, the response parameters are y and z. The eigenvalue difference equation (EDE) between the two systems may be written as (18):

$$\dot{\xi}(t) = A\xi(t)$$

where A is a scaling factor and $$\xi(t)=p(\tau)=x(\tau)-x'(\tau) q(\tau)=y(\tau)-y'(\tau) r(\tau)=z(\tau)-z'(\tau)$$

The unprimed/primed functions refer to the left-hand/righthand of the interacting Chua circuits illustrated in FIG. 19. The op-amp follower enables the two x-driven Chua circuits to interact without significant impact to each individual Chua circuit. The state equations of the overall system become (19), (20), (21), (22), and (23):

$$\dot{x}=\dot{x}'=\alpha(y-a-f(x))$$

$$\dot{y}=x-y+z$$

$$\dot{y}'=x-y'+z'$$

$$\dot{z}=-\beta y$$

$$\dot{z}'=-\beta y'$$

Interacting chaotic systems will synchronize if the critical Lyapunov exponents (CLE) are negative. The sought after CLE is the real component of the eigenvalues of the difference equation represented by the EDE, equation 18 above. Since the x-parameters of the two Chua circuits are forced to be equal via the voltage follower, the difference equation between the two remaining parameters, q and r, of the system response may be written in matrix form as (24):

$$\begin{bmatrix} \dot{q} \\ \dot{r} \end{bmatrix} = \begin{bmatrix} -1 & 1 \\ -\beta & 0 \end{bmatrix} \begin{bmatrix} q \\ r \end{bmatrix}$$

with the eigenvalues of the difference equation given by $-\frac{1}{2}\pm\frac{1}{2}\sqrt{4\beta-1}$. With $\beta$ always being a positive value, the eigen values lead to the solution $\xi(\tau)$ in (25):

$$\xi(\tau)=e^{-\tau/2}(C\cos(\sqrt{4\beta-1}/2)_\tau + D\sin(\sqrt{4\beta-1}/2)_\tau)$$

In this equation, C and D are integration constants. The real component of the eigenvalues is negative ($-\frac{1}{2}$) and does not depend on any parameter of the system. Since the exponential is negative, the limit of the above equation is 0 as the time approaches infinity indicating that the two Chua circuits indeed synchronize. The circuits can now be experimentally validated to synchronize.

The PSIM circuit illustrated in FIG. 20 represents three x driven self-synchronizing Chua circuits. The synchronization of the final system in chaos and stable limit-cycle serves to validate the design and lead into the inverter implementation.

The bifurcation parameter B is adjusted using R to move the response from the double scroll to the periodic limit-cycle state. As illustrated in FIG. 21A, the first two Chua circuits successful synchronize with identical double-scroll responses. The simulated synchronization result of the second and third Chua circuit is identical. In the periodic state illustrated in FIG. 21B, the first two circuits are also shown to synchronize with the second and third circuits synchronization result following identically. The simulation results were verified experimentally.

The synchronized response of two inductor-less Chua circuits in the periodic limit-cycle state is illustrated in FIG. 21C.

The next section uses three synchronized inductor-less Chua circuits to synchronize three DC/AC inverters to form an islanded microgrid.

IV. DC/AC Inverter Syncronization

The synchronized x-driven voltage response vC1 of each Chua circuit is used to synchronize the inverters. The reference voltages vC1 are used to generate PWM signals that drive the switching devices of each inverter. The inverters' outputs are filtered using LCL Filters and are connected to a common load. Simulations and experiments were done to verify that the inductor-less Chua circuits can synchronize inverters to form an inverter-based microgrid.

A. PSIM Simulations

The inverters are driven using the synchronized reference voltage from the Chua circuits. FIG. 22 shows that the inverters' output voltage synchronize and that the output currents are identical which shows proper load sharing. The inverters synchronize in two to three cycles. In simulation, the inverters run at 120 VAC, and experimentally they run at 22 VAC.

B. Experimental Results: The experimental setup was built using the ST Micro Electronics' EVAL6491HB half-bridge converter (HBC) demonstration board. The load voltage showed that the three inverters synchronized to deliver the expected load voltage. Moreover, the inverter currents were synchronized and similar which shows proper load sharing between the three inverters.

DISCUSSION

The description and examples above define an inductor-less Chua circuit that is capable of chaotic and limit-cycle modes at frequencies below 1 kHz. The Chua circuit was realized for self-synchronization at a cost less than $2 (USD 2018) with quantity pricing. The chaotic and limit-cycle modes were verified with PSIM simulations and hardware experiments. Results also showed the self-synchronizing feature of the inductor-less Chua circuits in chaotic and limit-cycle modes. The synchronization topology was a master-slave relationship due to the voltage follower connection which if removed would lead to bidirectional synchronization. In the x-driven slave circuits, the capacitor C1 and non-linear resistor NR shown in FIG. 16 are actually unnecessary, but are included in case of failure of the master thus increasing the resiliency of the system.

A novel method to synchronize inverters in an islanded microgrid using the limit-cycle mode of the Chua circuit at 60 Hz has also been described. Synchronization was at the PWM circuitry level which resulted in synchronized AC voltage and proper load sharing between the inverters.

Self-synchronizing inverter-based DERs using Chua circuits provides a new opportunity for increasing access and affordability of electricity by reducing the cost of microgrid energy management systems and controls. By synchronizing three inverters in a stable state, the application is more easily expanded to n inverters. Proper manipulation and derivation of component values can provide an optimized response for varying applications requiring frequencies below 1 kHz. Communication effects between the Chua circuits were neglected since rural islanded microgrids are spread over small geographical distances.

EXAMPLES

Some examples of embodiments of the present disclosure are provided here.

Example 1. A self-synchronizing electrical device comprising: an input for receiving input electricity from an electrical source; a converter circuit to convert the input electricity at the input to AC electricity at an AC output; a synchronization unit configured to operate with a non-linear characteristic; and an AC connection to connect the AC output of the self-synchronizing electrical device to a power grid; wherein the synchronization unit of the self-synchronizing inverter is to receive a reference sine-wave AC signal from the power grid; and wherein the synchronization unit synchronizes the AC output with the power grid based on the reference sine-wave AC signal to produce a combined synchronized AC power output to the power grid.

Example 2. The self-synchronizing electrical device of Example 1, wherein the input electricity is AC electricity.

Example 3. The self-synchronizing electrical device of Example 1, wherein the input electricity is DC electricity from a DER.

Example 4. The self-synchronizing electrical device of Example 1, wherein the synchronization unit provides unidirectional synchronization between the self-synchronizing electrical device and the power grid.

Example 5. A self-synchronizing electrical device comprising: an input for receiving input electricity from a DC electrical source; a converter circuit to convert the input electricity at the input to AC electricity at a first AC output; a synchronization unit configured to operate with a non-linear characteristic; and a connection to connect the first AC output to a second AC output of at least one additional self-synchronizing electrical device in parallel, wherein the synchronization unit of the self-synchronizing inverter receives a reference signal from the at least one additional self-synchronizing electrical device, and wherein the synchronization unit synchronizes the first AC output with the second AC output based on the reference signal to produce a combined synchronized AC power output.

Example 6. The self-synchronizing electrical device of Example 5, wherein the input electricity is AC electricity.

Example 7. The self-synchronizing electrical device of Example 5, wherein the input electricity is DC electricity from a distributed energy resource (DER).

Example 8. The self-synchronizing electrical device of Example 5, wherein the synchronization unit provides bidirectional synchronization between the self-synchronizing electrical device and the at least one additional self-synchronizing electrical device.

Example 9. A self-synchronizing inverter for converting direct current (DC) electricity to alternating current (AC) electricity, comprising: a DC input for receiving DC electricity from a DC electrical source; a converter circuit to convert the DC electricity at the DC input to AC electricity at a first AC output; a synchronization unit configured to operate with a non-linear characteristic; and a connection to connect the first AC output to a second AC output of at least one additional self-synchronizing inverter in parallel, wherein the synchronization unit of the self-synchronizing inverter receives a reference sine-wave AC signal from the at least one additional self-synchronizing inverter, and wherein the synchronization unit synchronizes the first AC output with the second AC output based on the reference sine-wave AC signal to produce a combined synchronized AC power output.

Example 10. The self-synchronizing inverter of Example 9, wherein the synchronization unit comprises a non-linear circuit to provide the non-linear characteristic.

Example 11. The self-synchronizing inverter of Example 10, wherein the non-linear circuit is capable of chaotic behavior.

Example 12. The self-synchronizing inverter of Example 11, wherein the non-linear circuit operates in a limit-cycle mode.

Example 13. The self-synchronizing inverter of Example 12, wherein the synchronization unit utilizes the limit-cycle mode of the non-linear circuit to synchronize the converter circuit with another self-synchronizing inverter to provide the combined synchronized AC output.

Example 14. The self-synchronizing inverter of Example 11, wherein the non-linear circuit comprises an oscillator. Examples of oscillators include, but are not limited to: a Van der Pol oscillator, a Rössler attractor, a Lorentz oscillator, a Colpitts oscillator, a neon bulb oscillator, a Rayleigh oscillator, a Nishio oscillator circuit, a negative resistance oscillator, and a Chaotic oscillator.

Example 15. The self-synchronizing inverter of Example 10, wherein the non-linear circuit comprises a Chua circuit.

Example 16. The self-synchronizing inverter of Example 15, wherein multiple Chua circuits sync in chaotic and limit-cycle modes.

Example 17. The self-synchronizing inverter of Example 10, wherein the non-linear circuit comprises: one or more non-linear elements; one or more locally active resistors; and three or more energy-storage elements.

Example 18. The self-synchronizing inverter of Example 9, wherein the synchronization unit provides bidirectional synchronization between the self-synchronizing inverter and the at least one additional self-synchronizing inverter.

Example 19. The self-synchronizing inverter of Example 9, wherein the synchronization unit provides unidirectional synchronization between the self-synchronizing inverter and the at least one additional self-synchronizing inverter.

Example 20. The self-synchronizing inverter of Example 9, wherein the synchronization unit provides load sharing between the self-synchronizing inverter and the at least one additional self-synchronizing inverter.

Example 21. The self-synchronizing inverter of Example 9, wherein the connection is to connect the self-synchronizing inverter to multiple additional self-synchronizing inverters.

Example 22. The self-synchronizing inverter of Example 21, wherein the reference sine-wave AC signal is the output of one of the additional self-synchronizing inverters.

Example 23. A self-synchronizing inverter for converting DC electricity to alternating current (AC) electricity, comprising: a DC input for receiving DC electricity from a DC electrical source; a converter circuit to convert the DC electricity at the DC input to AC electricity at an AC output; a synchronization unit configured to operate with a non-linear characteristic; and an AC connection to connect the AC output of the self-synchronizing inverter to a power grid; wherein the synchronization unit of the self-synchronizing inverter is to receive a reference sine-wave AC signal from the power grid; and wherein the synchronization unit synchronizes the AC output with the power grid based on the reference sine-wave AC signal to produce a combined synchronized AC power output to the power grid.

Example 24. The self-synchronizing inverter of Example 23, wherein the synchronization unit comprises a non-linear circuit to provide the non-linear characteristic.

Example 25. The self-synchronizing inverter of Example 24, wherein the non-linear circuit is capable of chaotic behavior.

Example 26. The self-synchronizing inverter of Example 25, wherein the non-linear circuit operates in a limit-cycle mode.

Example 27. The self-synchronizing inverter of Example 26, wherein the synchronization unit utilizes the limit-cycle mode of the non-linear circuit to synchronize the converter circuit with the power grid to provide the combined synchronized AC output.

Example 28. The self-synchronizing inverter of Example 25, wherein the non-linear circuit comprises an oscillator.

Example 29. The self-synchronizing inverter of Example 24, wherein the non-linear circuit comprises a Chua circuit.

Example 30. The self-synchronizing inverter of Example 29, wherein multiple Chua circuits sync in chaotic and limit-cycle modes.

Example 31. The self-synchronizing inverter of Example 24, wherein the non-linear circuit comprises: one or more non-linear elements; one or more locally active resistors; and three or more energy-storage elements.

Example 32. The self-synchronizing inverter of Example 23, wherein the synchronization unit provides unidirectional synchronization between the self-synchronizing inverter and the power grid.

Example 33. A method for synchronizing inverters, comprising: electrically coupling a first synchronization unit to a first direct current (DC) to alternating current (AC) inverter, the first synchronization unit comprising a first non-linear characteristic; electrically coupling a second synchronization unit to a second DC to AC inverter, the second synchronization unit comprising a second non-linear characteristic; receiving electricity from a first DC electrical source at a first DC input at the first DC to AC inverter; converting DC electricity at the first DC input to AC electricity at a first AC output; receiving electricity from a second DC electrical source at a second DC input at the second DC to AC inverter; converting DC electricity at the second DC input to AC electricity at a second AC output; connecting the first AC output to the second AC output in parallel; electrically coupling the first synchronization unit to receive a reference sine-wave AC signal from the second synchronization unit; and wherein the first synchronization unit synchronizes the first AC output with the second AC output based on the reference sine-wave AC signal to produce a combined synchronized AC power output.

Example 34. The method of Example 33, wherein the first synchronization unit and the second synchronization unit each comprises a non-linear circuit to provide the respective first and second non-linear characteristic.

Example 35. The method of Example 34, wherein the non-linear circuit is capable of chaotic behavior.

Example 36. The method of Example 34, wherein the non-linear circuit operates in a limit-cycle mode.

Example 37. The method of Example 36, wherein the first synchronization unit and the second synchronization unit each utilizes the limit-cycle mode of the non-linear circuit to synchronize the converter circuit with another self-synchronizing inverter to provide the combined synchronized AC output.

Example 38. The method of Example 34, wherein the non-linear circuit comprises an oscillator.

Example 39. The method of Example 34, wherein the non-linear circuit comprises a Chua circuit.

Example 40. The method of Example 39, wherein multiple Chua circuits sync in chaotic and limit-cycle modes.

Example 41. The method of Example 34, wherein the non-linear circuit comprises: one or more non-linear elements; one or more locally active resistors; and three or more energy-storage elements.

Example 42. The method of Example 33, wherein the first synchronization unit and the second synchronization unit each provides bidirectional synchronization between the first DC to AC inverter and the second DC to AC inverter.

Example 43. The method of Example 33, wherein the first synchronization unit and the second synchronization unit each provides load sharing between the first DC to AC inverter and the second DC to AC inverter.

Example 44. The method of Example 33, wherein the first synchronization unit and the second synchronization unit are connected to multiple additional synchronization units.

Example 45. The method of Example 44, wherein the reference sine-wave AC signal is the AC electricity at the second AC output of the second DC to AC inverter.

Example 46. A system for self-synchronizing inverters comprising: two or more self-synchronizing inverters connected in parallel to provide a combined synchronized output, each synchronizing inverter of the two or more self-synchronizing inverters comprising: a direct current (DC) input to receive DC electricity from a DC electrical source; a converter circuit to convert the DC electricity at the DC input to AC electricity at an alternating current (AC) output; and a synchronization unit comprising a non-linear characteristic; and a node to connect a first AC output of a first self-synchronizing inverter of the two or more self-synchronizing inverters to a second AC output of a second self-synchronizing inverter of the two or more self-synchronizing inverters, wherein the first synchronization unit receives a reference sine-wave AC signal from the second synchronization unit, and wherein the first synchronization unit synchronizes the first AC output with the second AC output based on the reference sine-wave AC signal to produce a combined synchronized AC power output at the node.

Example 47. The system of Example 46, wherein the synchronization unit comprises a non-linear circuit to provide the non-linear characteristic.

Example 48. The system of Example 47, wherein the non-linear circuit is capable of chaotic behavior.

Example 49. The system of Example 48, wherein the non-linear circuit operates in a limit-cycle mode.

Example 50. The system of Example 49, wherein the synchronization unit utilizes the limit-cycle mode of the non-linear circuit to synchronize the converter circuit based on the reference sine-wave AC signal to provide the combined synchronized AC output.

Example 51. The system of Example 47, wherein the non-linear circuit comprises an oscillator.

Example 52. The system of Example 47, wherein the non-linear circuit comprises a Chua circuit.

Example 53. The system of Example 52, wherein multiple Chua circuits sync in chaotic and limit-cycle modes.

Example 54. The system of Example 47, wherein the non-linear circuit comprises: one or more non-linear elements; one or more locally active resistors; and three or more energy-storage elements.

Example 55. The system of Example 46, wherein the synchronization unit provides bidirectional synchronization between the two or more self-synchronizing inverters.

Example 56. The self-synchronizing inverter of Example 46, wherein the synchronization unit provides unidirectional synchronization between the self-synchronizing inverter and the at least one additional self-synchronizing inverter.

Example 57. The system of Example 46, wherein the synchronization unit provides load sharing between the two or more self-synchronizing inverters.

Example 58. The system of Example 46, wherein the node is to connect the two or more self-synchronizing inverters to multiple additional self-synchronizing inverters.

Example 59. The system of Example 46, wherein the reference sine-wave AC signal is the output of another self-synchronizing inverter of the two or more self-synchronizing inverters.

Example 60. A self-synchronizing driver comprising: a driver output to provide a reference signal for driving a drivable device; a reference input to receive a reference signal from at least one additional self-synchronizing device; and synchronization capability comprising a non-linear characteristic, wherein the synchronization capability synchronizes the driver with the at least one additional self-synchronizing device, based on the reference signal.

Example 61. The self-synchronizing driver of Example 60, wherein the self-synchronizing driver is implemented in an electrical control system.

Example 62. The self-synchronizing driver of Example 61, wherein the electrical control system includes at least one of: an inverter, a synchronizer, a generator control system, and a microgrid control system.

Example 63. The self-synchronizing driver of Example 60, wherein the synchronization unit comprises a non-linear circuit to create the non-linear characteristic.

Example 64. The self-synchronizing driver of Example 63, wherein the non-linear circuit is capable of chaotic behavior.

Example 65. The self-synchronizing driver of Example 64, wherein the non-linear circuit operates in a limit-cycle mode.

Example 66. The self-synchronizing driver of Example 65, wherein the synchronization capability utilizes the limit-cycle mode of the non-linear circuit to synchronize the reference signal at the driver output with the at least one additional self-synchronizing device.

Example 67. The self-synchronizing driver of Example 63, wherein the non-linear circuit comprises an oscillator.

Example 68. The self-synchronizing driver of Example 63, wherein the non-linear circuit comprises a Chua circuit.

Example 69. The self-synchronizing driver of Example 63, wherein the non-linear circuit comprises: one or more non-linear elements; one or more locally active resistors; and three or more energy-storage elements.

Example 70. The self-synchronizing driver of Example 60, wherein the at least one additional self-synchronizing device comprises a self-synchronizing inverter.

Example 71. The self-synchronizing driver of Example 70, wherein the reference signal is an alternating current (AC) electricity output of the self-synchronizing inverter.

Example 72. The self-synchronizing driver of Example 70, wherein the reference signal is an alternating current (AC) electricity output of the self-synchronizing inverter connected in parallel to at least one other self-synchronizing device.

Example 73. The self-synchronizing driver of Example 60, wherein the reference signal is an alternating current (AC) electricity output of the at least one additional self-synchronizing device.

Example 74. The self-synchronizing driver of Example 60, wherein the reference signal is a quasiperiodic reference signal or another self-synchronizing driver.

Example 75. The self-synchronizing driver of Example 60, wherein the drivable device comprises an inverter.

Example 76. The self-synchronizing driver of Example 60, wherein the drivable device comprises an electric motor.

Example 77. The self-synchronizing driver of Example 60, wherein the drivable device comprises a mechanical device.

Example 78. The self-synchronizing driver of Example 60, wherein the synchronization capability comprises electronic hardware.

Example 79. The self-synchronizing driver of Example 60, wherein the synchronization capability comprises one or more software modules executed by one or more processors to simulate an electronic circuit.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

It will be obvious to those having skill in the art that many changes may be made to the details of the above-described embodiments without departing from the underlying principles of the invention. The scope of the present invention should, therefore, be determined only by the following claims.

The invention claimed is:

1. A system for self-synchronizing inverters comprising:
a plurality of self-synchronizing inverters connected in parallel to provide a combined synchronized output, each self-synchronizing inverter of the plurality of self-synchronizing inverters comprising:
a direct current (DC) input to receive DC electricity from a DC electrical source;
a converter circuit to convert the DC electricity at the DC input to alternating current (AC) electricity at an AC output; and
a synchronization unit to operate with a non-linear characteristic; and
a node to connect an AC output of a first self-synchronizing inverter of the plurality of self-synchronizing inverters to an AC output of a second self-synchronizing inverter of the plurality of self-synchronizing inverters, wherein the synchronization unit of the first self-synchronizing inverter receives a reference sine-wave AC signal from the synchronization unit of the second self-synchronizing inverter, and wherein the synchronization unit of the first self-synchronizing inverter synchronizes the AC output of the first self-synchronizing inverter with the AC output of the second self-synchronizing inverter based on the reference sine-wave AC signal to produce a combined synchronized AC power output at the node.

2. The system of claim 1, wherein the synchronization unit of each self-synchronizing inverter of the plurality of self-synchronizing inverters comprises a non-linear circuit configured to provide the non-linear characteristic.

3. The system of claim 2, wherein the non-linear circuit is configured to provide an output with chaotic behavior.

4. The system of claim 3, wherein the non-linear circuit of the synchronization unit of each self-synchronizing inverter of the plurality of self-synchronizing inverters is configured to operate in a limit-cycle mode to synchronize the output of the converter circuit of each self-synchronizing inverter of the plurality based on the reference sine-wave AC signal.

5. The system of claim 2, wherein the non-linear circuit of the synchronization unit of each self-synchronizing inverter of the plurality of self-synchronizing inverters comprises an oscillator.

6. The system of claim 2, wherein the non-linear circuit of the synchronization unit of each self-synchronizing inverter of the plurality of self-synchronizing inverters comprises a Chua circuit.

7. The system of claim 6, wherein each Chua circuit of the synchronization unit of each self-synchronizing inverter of the plurality of self-synchronizing inverters is configured to synchronize in a chaotic mode and a limit-cycle mode.

8. The system of claim 2, wherein the non-linear circuit of the synchronization unit of each self-synchronizing inverter of the plurality of self-synchronizing inverters comprises:
one or more non-linear elements;
one or more locally active resistors; and
three or more energy-storage elements.

9. The system of claim 1, wherein the reference sine-wave AC signal received by each synchronization unit of each self-synchronizing inverter of the plurality of self-synchronizing inverters for bidirectional synchronization between the output of each self-synchronizing inverter of the plurality of self-synchronizing inverters.

10. The system of claim 1, wherein the synchronization unit of each self-synchronizing inverter of the plurality of self-synchronizing inverters provides unidirectional synchronization of the self-synchronizing inverters.

11. The system of claim 1, wherein the synchronization unit of each self-synchronizing inverter of the plurality of self-synchronizing inverters is configured in parallel to synchronize the output of each self-synchronizing inverter for load sharing between the self-synchronizing inverters.

12. The system of claim 1, wherein the node is to connect at least one self-synchronizing inverter of the plurality of self-synchronizing inverters to multiple other self-synchronizing inverters.

13. The system of claim 1, wherein the reference sine-wave AC signal is the output of the first self-synchronizing inverter of the plurality of self-synchronizing inverters.

14. A system for self-synchronizing inverters comprising:
a first self-synchronizing inverter and a second self-synchronizing inverter connected in parallel to provide a combined synchronized output, the first and second self-synchronizing inverter each comprising:
a direct current (DC) input to receive DC electricity from a DC electrical source;
a converter circuit to convert the DC electricity at the DC input to alternating current (AC) electricity at an AC output; and
a synchronization unit to operate with a non-linear characteristic,
wherein the synchronization unit of the first self-synchronizing inverter receives a reference sine-wave AC signal from the synchronization unit of the second self-synchronizing inverter, and wherein the synchronization unit of the first self-synchronizing inverter synchronizes the AC output of the first self-synchronizing inverter with the AC output of the second self-synchronizing inverter based on the reference sine-wave AC signal to produce a combined synchronized AC power output.

15. The system of claim 14, wherein the synchronization unit of each of the first and second self-synchronizing inverters comprises a non-linear circuit to provide the non-linear characteristic.

16. The system of claim 15, wherein the non-linear circuit is configured to provide an output with chaotic behavior.

17. The system of claim 15, wherein the non-linear circuit of the synchronization unit of each of the first and second self-synchronizing inverters comprises at least one of an oscillator and a Chua circuit.

18. The system of claim 17, wherein each Chua circuit of the synchronization unit of each self-synchronizing inverter of the plurality of self-synchronizing inverters is configured to synchronize in a chaotic mode and a limit-cycle mode.

19. The system of claim 14, wherein the reference sine-wave AC signal is received by the synchronization unit of each of the first and second self-synchronizing inverters to provide bidirectional synchronization between the outputs of the first and the second self-synchronizing inverters.

20. The system of claim 14, wherein the synchronization unit of each of the first and second self-synchronizing inverters provides unidirectional synchronization between each of the self-synchronizing inverters.

21. The system of claim 14, wherein the synchronization unit of each of the first and second self-synchronizing inverters is configured in parallel to synchronize the output of each self-synchronizing inverter for load sharing between the self-synchronizing inverters.

22. The system of claim 14, wherein the reference sine-wave AC signal is the output of a third self-synchronizing inverter.

* * * * *